US007352858B2

(12) United States Patent
Stokes et al.

(10) Patent No.: US 7,352,858 B2
(45) Date of Patent: Apr. 1, 2008

(54) MULTI-CHANNEL ECHO CANCELLATION WITH ROUND ROBIN REGULARIZATION

(75) Inventors: Jack W. Stokes, North Bend, WA (US); John C. Platt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 10/883,128

(22) Filed: Jun. 30, 2004

(65) Prior Publication Data

US 2006/0002547 A1 Jan. 5, 2006

(51) Int. Cl.
*H04M 9/08* (2006.01)
(52) U.S. Cl. ............................. 379/406.08; 379/406.06
(58) Field of Classification Search .................. 381/66, 381/93, 94.1; 379/406.06, 406.08
See application file for complete search history.

(56) References Cited

U.S. PATENT DOCUMENTS

| | | | |
|---|---|---|---|
| 5,305,307 A | | 4/1994 | Chu |
| 5,677,951 A | * | 10/1997 | Gay ...................... 379/406.08 |
| 6,055,311 A | | 4/2000 | Dreyfert |
| 6,108,413 A | * | 8/2000 | Capman et al. ........ 379/406.13 |
| 2003/0081764 A1 | * | 5/2003 | Kosanovic et al. ..... 379/406.01 |
| 2005/0157866 A1 | * | 7/2005 | Marton et al. ......... 379/406.08 |

FOREIGN PATENT DOCUMENTS

EP 0926840 4/2000

OTHER PUBLICATIONS

Benesty, J., Morgan, D. R., and Sondhi, M. M., "A better understanding and an improved solution to the problems of stereophonic acoustic echo cancellation," in *Proc. IEEE ICASSP*, 1997, pp. 303-306.
Benesty, J., Amand, F., Gilloire, A., and Grenier, Y., "Adaptive filtering algorithms for stereophonic acoustic echo cancellation," in *Proc. IEEE ICASSP*, 1995, pp. 3099-3102.
Benesty, J., Morgan, D. R., and Sondhi, M. M., "A hybrid mono/stereo acoustic echo canceler," in *IEEE Trans. Speech Audio Processing*, vol. 6, pp. 468-475, Sep. 1998.

(Continued)

*Primary Examiner*—Curtis A Kuntz
*Assistant Examiner*—Alexander Jamal
(74) *Attorney, Agent, or Firm*—Lyon & Harr, L.L.P.; Craig S. Fischer

(57) ABSTRACT

A method and system of multi-channel echo cancellation using round robin regularization. The multi-channel round robin regularization echo cancellation method includes applying a plurality of adaptive filters, each having an inverse correlation matrix, to the multi-channel playback signal. Each of the plurality of adaptive filters is selected in a round robin sequence, so that every round each of the filters is selected. The inverse correlation matrix associated with each selected adaptive filter then is regularized as needed. The regularized adaptive filter then is used to remove the echo of the multi-channel playback signal from a captured signal. Regularization is implemented in a round robin manner to ensure that each subband is selected so that the adaptive filter for that subband can be examined. Other features of the multi-channel echo cancellation system and method include dynamic switching between monaural and multi-channel echo cancellation and mixed processing for lower and upper subbands.

34 Claims, 12 Drawing Sheets

OTHER PUBLICATIONS

Eneroth, P., Gansler, T., Gay, S. Benesty, J., "Studies of a Wideband Stereophonic Acoustic Echo Canceler", *Applications of Signal Processing to Audio and Acoustics, 1999 IEEE Workshop on*, Oct. 17-20, 1999, pp. 207-210.

Gilloire, A. "Experiments with Sub-band Acoustic Echo Cancelers for Teleconferencing", 1987 International Conference on Acoustics, Speech, and Signal Processing, 1987, pp. 2141-2144.

Hatty, B., "Recursive Least Squares Algorithms using Multirate Systems for Cancellation of Acoustical Echoes", 1990 International Conference on Acoustics, Speech, and Signal Processing, Apr. 3-6, 1990, vol. 2, pp. 1145-1148.

Malvar, H. S., "A Modulated Complex Lapped Transform and Its Applications to Audio Processing", Proc. *ICASSP*, pp. 1421-1424, Mar. 1999.

Slock, D. and Kailath, T. "Numerically Stable Fast Transversal Filters for Recursive Least Squares Adaptive Filtering", IEEE Trans. Signal Processing, vol. 39, No. 1. Jan. 1991.

Sondhi, M., and Morgan, D., "Acoustic echo cancellation for stereophonic teleconferencing", Proc. IEEE Workshop Appls. Signal Processing Audio Acoustics, 1991.

Chau, E., H. Sheikhzadeh, and R. Brennan, Complexity reduction and regularization of a fast affine projection algorithm for oversampled subband adaptive filters, *IEEE Int'l Conf. on Acoustics, Speech, and Signal Processing (ICASSP* 2004), pp. 109-112.

Eneroth, P., S. Gay, T. Gänsler and J. Benesty, A real-time implementation of a stereophonic acoustic echo canceler, *IEEE Transactions on Speech and Audio Processing*, vol. 9, No. 5, Jul. 2001, pp. 513-523.

Gay, S., Dynamically regularized fast RLS with application to echo cancellation, *Proceedings of the Int'l Conf. on Acoustic Speech and Signal Processing*, Atlanta, 1996, pp. 957-960.

Gunnarsson, S., On covariance modification and regularization in recursive least squares identification, *10th. IFAC Symposium on Sys. Identification (SYSID '94)*, Copenhagen, Denmark, Jul. 1994, vol. 2, pp. 661-666.

Hatty, R., Recursive least squares algorithms using multirate systems for cancellation of acoustical echoes, *Proceedings of the Int'l Conf. on Acoustic Speech and Signal Processing*, 1990, pp. 1145-1148.

European Search Report, Application No. 5105693.5, completed Feb. 1, 2006, received Feb. 15, 2006.

European Search Report, Application No. EP05105693.5, completed May 22, 2006, mailed Jun. 12, 2006.

* cited by examiner

MULTI-CHANNEL ECHO CANCELLATION WITH ROUND ROBIN REGULARIZATION

TECHNICAL FIELD

The present invention relates in general to signal processing and more particularly to method and system of canceling the echo of multiple playback channels in a captured channel using round robin regularization.

BACKGROUND OF THE INVENTION

Echo cancellation is an important element in a variety of applications. In general, echo cancellation is the digital cancellation of electrical and acoustic echoes such that the echoes are attenuated or eliminated. Echo cancellation is essential in applications such as communications systems, where it is used to improve sound quality. Echo cancellation is used to overcome several different types of echoes, including hybrid echoes, caused by an impedance mismatch along an electrical line (including a telephone line), and acoustic echoes, caused by acoustic coupling of sound from a loudspeaker to a microphone. These types of echoes appear in several different technologies, such as wireless telephony, hands-free telephony, teleconferencing systems, Internet telephony, and speech recognition systems. By using echo cancellation, the sound quality and usefulness of these and many other technologies is improved.

One type of echo cancellation is acoustic echo cancellation, which is used to cancel out the echoes of acoustic sound waves. Typically, these echoes are formed when sounds emitted by one or more loudspeakers is picked up by one or more microphones. Acoustic echoes can be quite noticeable and even annoying to a user.

In general, the acoustic echo cancellation works by obtaining one or more playback signals, each going to corresponding loudspeakers and subtracting an estimate of the echo produced by that playback signal from the one or more microphone signals. More specifically, the playback signals through this echo loop are transformed and delayed, background noise and possibly near end speech are added at the microphone, and a subtraction process for the echo cancellation is used. The signal obtained after subtraction is called the error signal, and the goal is to minimize the error signal when no near end speech is present in the microphone signal.

The heart of acoustic echo cancellation system is adaptive filtering. In general, an adaptive filter is used to identify or "learn" a transfer function of the room that contains the loudspeakers and microphones. This transfer function will depend a great deal on the physical characteristics of the room environment. The adaptive filter works by taking the playback signal sent to the speakers and adjusting in a recursive manner some coefficients that represent an impulse response of the room. The error signal, which is the estimated echo subtracted from the actual echo, is used to change the filter coefficients such that the error is minimized.

Traditionally, the playback signals are each processed as a single stream of temporal samples, with a single delay line and a single filter. To improve upon this, the playback signal can be split into subbands and a plurality of adaptive filters can be run in parallel, one adaptive filter per subband. Changing the length of the adaptive filters in the different subbands depending on the echo length in that subband in order to reduce the computational complexity is discussed in a paper by A. Gilloire entitled "Experiments with Sub-band Acoustic Echo Cancellers for Teleconferencing" in 1987 International Conference on Acoustics, Speech, and Signal Processing, 1987, pp. 2141-2144. From that paper, the adaptive filters for the lower subbands can be made longer in order to save CPU computation cycles because the bass tends to reverberate longer. In the upper subbands, the filters can be shorter. Thus, Gilloire's paper implied that longer adaptive filters in the lower subbands and shorter adaptive filters in the higher subbands can be used.

To cancel the echoes in a captured signal, each subband of the playback signal is stored in a digital delay line, where the delayed subband signals are separated into taps. At each tap, the playback signal is sampled. The number of taps of a filter describes the length of the digital delay line. For example, four taps means that the playback signal is sampled at the current frame, current frame-1, current frame-2, and current frame-3. Each of the delays is equal to the frame length (which can be, by way of example, approximately 16 milliseconds or 20 milliseconds). Thus, if the frame length is 16 ms, and there are four taps (or a 4-long adaptive filter), and if the adaptive filters are implemented using adaptive subband filtering in the frequency domain, the playback signal is examined at a current frame, the frame 16 ms earlier, the frame 32 ms earlier, and the frame 48 ms earlier than the current time.

Each sample gets multiplied by the complex conjugate of a weight (called a tap weight, W), the multiplied weight is summed, and then is subtracted from the microphone signal. Each tap weight is adjusted to minimize the output power. Minimizing the output power suppresses as much of the speaker signal as possible, thereby reducing echoes.

Acoustic echo cancellation was first used on monaural (or mono) systems. FIG. 1 illustrates a single channel, acoustic echo cancellation (AEC) system 100 used to process a mono, playback signal. A mono playback signal x 105 is copied into equal multi-channel signals and then played through a right speaker 110 and a left speaker 120. Echoes 130, 140 from each of the speakers 110, 120 are reflected off a wall 150 in a room and captured by a microphone 160. The microphone also captures desired speech 165 (such as from a teleconference participant) and background noise 170.

The echoes 130, 140, desired speech 165 and background noise 170 combine to construct a microphone signal y. The microphone signal y is processed by a first analysis filterbank 175 and the playback signal x is processed by a second analysis filterbank 180 such that signals x and y are transformed from the time domain into frequency domain signals X and Y, respectively. It is important to perform AEC in the frequency domain because the echoes in AEC are quite long and the adaptive filters converge more often and faster in the frequency domain than in the time domain. It should be noted that the analysis filterbanks 175, 180 can be implemented as any complex frequency domain transform such as a windowed (including the box window) fast Fourier transform (FFT) or, in an exemplary embodiment, a modulated complex lapped transform (MCLT).

The transformed X and Y signals are input to an AEC mono processor 185 that uses an adaptive filter to learn the transfer function of the room to minimize an error signal. The processed signal is sent to a synthesis filterbank 190 that transforms the echo-reduced, frequency domain signal containing near end speech back to the time domain. Note that the mono AEC processor in FIG. 1 only uses a single adaptive filter per subband.

FIG. 2 is a detailed block diagram of the mono AEC processor 185 shown in FIG. 1 for a single subband m and frame n. The mono AEC processor 185 contains a single adaptive filter 200 for each subband. An adaptive filter coefficient update 210 is used to update the processed coefficients of the subband adaptive filter 200. When the mono playback signal x is played to the speakers 110, 120, as shown in FIG. 1, the single adaptive filter 200 is implemented. In a typical embodiment, the adaptive filter uses a normalized, least mean square (NLMS) algorithm having regularization. The NLMS algorithm with regularization is set forth in detail below.

When dividing one number by a second number, regularization is the process of adding or subtracting a small value to the denominator to ensure that the denominator never becomes zero, which in turn would cause the fraction to become infinite. An alternative way to regularize the fraction is to set the denominator equal to some threshold if the denominator is positive and less than the threshold. Likewise, if the denominator is negative, set the denominator to a negative threshold if it is less than the negative threshold.

The single channel AEC system 100 shown in FIG. 1 is only for removing echo from a mono playback signal. One of the first papers to discuss extending AEC to stereo was a paper by M. Sondhi and D. Morgan entitled "Acoustic echo cancellation for stereophonic teleconferencing" in Proc. IEEE Workshop Appls. Signal Processing Audio Acoustics in 1991. However, while the NLMS algorithm works well for the mono AEC problem, NLMS performs poorly in the stereo (or other multi-channel) AEC problem. This is because NLMS does not consider the cross-channel correlation of the multi-channel playback signal which significantly slows down the convergence of the adaptive filters.

Sondhi and Morgan suggested using recursive least squares (RLS) instead of NLMS to solve the stereo AEC problem. The RLS algorithm is an alternative algorithm for adjusting the parameters (or weights) of the adaptive filters. The reason RLS works better than NLMS is that RLS tends to decorrelate the playback channels. Since RLS recursively computes an estimate of the inverse of a correlation matrix of the input speaker data, it can learn the correlation between the speaker channels and quickly converge to the correct solution. Shondhi and Morgan, however, merely proposed potentially using the RLS algorithm instead of NLMS, but provided no detail.

FIG. 3 illustrates a stereo AEC system 300 used to process a stereo playback signal. The stereo AEC system 300 shown in FIG. 3 is a subband-based system, meaning that the speaker signal is split into a plurality of subbands and an adaptive filter is supplied for each subband. The adaptive filters are run in parallel. It should be noted that FIG. 3 illustrates the AEC system 300 having a stereo playback signal, although AEC systems can be designed that also work for multi-channel playback signals. In addition, a single microphone is illustrated in FIG. 3, but the AEC system 300 is easily extendible to multiple microphones.

Referring to FIG. 3, the stereo playback signal x is composed of two channels, a right stereo channel x(0) 302 and a left stereo channel x(1) 305, for the stereo playback case. For the multi-channel AEC case, the N channel playback case, the signal would be composed of channels x(0) to x(N−1). The playback signals 302 and 305 are converted to an analog signal by a digital-to-analog converter (D/A) (not shown).

The multi-channel playback signal (which includes the stereo signal) can be created in several different ways. FIG. 4 illustrates the AEC system 300 of FIG. 3 used with a voice communications system, such as Microsoft® Windows Messenger or voice chat for internet gaming. In FIG. 4, a digital, far-end mono speech signal 400 arrives from a source. The speech signal 400 is mixed locally with some stereo audio sounds such as $Music_{Left}$ 410 and $Music_{Right}$ 420, computer game sounds, or the computer's system sounds.

Alternatively, FIG. 5 illustrates the case where the multi-channel playback signal includes stereo music. In this case, the $Music_{Left}$ 410 is assigned to a multi-channel playback channel and the $Music_{Right}$ 420 is assigned to another multi-channel playback channel. There is no far-end speech that is mixed with the multi-channel sound.

In another alternate case, FIG. 6 illustrates the case where the multi-channel signal includes mono speech. This situation shown in FIG. 6 may be used for a Microsoft® Windows messenger system. The mono speech 600 is copied to each of the playback channels, but the multi-channel playback signal is monaural.

Referring back to FIG. 3, the playback signals 302, 305 next are played through a right speaker 310 and a left speaker 320, respectively. A first echo 330 and a second echo 340 are reflected off a wall 350 in a room (not shown) to produce echoes at the microphone 355. In the case of multiple microphones, a separate instance of the stereo AEC system 300 can process the signal captured from each microphone independently or one AEC algorithm could be processed on the mono output of a microphone array algorithm. In addition to the echo from the speakers, the audio signal that is captured by the microphone 355 is also composed of a desired speech 360 and background noise 365. The analog audio signal captured by the microphone 355 is converted into a digital microphone signal, y, by an analog-to-digital converter (A/D) (not shown).

Acoustic echo cancellation is often performed using adaptive subband filtering based on a frequency domain transform such as the fast windowed transform (FFT) or the modulated complex lapped transform (MCLT). A first filterbank 370 and a second filterbank 375 convert each of the stereo playback signals x(0) and x(1) from the time domain to the frequency domain signals X(0) and X(1), respectively. Likewise, a third analysis filterbank 380 converts the mono microphone signal y from the time domain to the frequency domain signal Y. The signals are processed by the stereo AEC processor 385 and the output Z is run through a synthesis filterbank 390. A time domain signal z with reduced echo then is output.

FIG. 7 is a detailed block diagram of the stereo AEC processor 385 for a single subband shown in FIG. 3. The stereo AEC processor contains a first adaptive filter 700 for the first multi-channel playback signal X(0) and a second adaptive filter 710 for the second multi-channel playback signal X(1). Note that separate single channel filters are run in parallel on each subband independent of the other subbands. As described above with regard to FIG. 3, the playback signals X(0), X(1) are processed and an adaptive filter coefficient update 720 is used to update the processed coefficients of the single channel filters 700, 710. The frequency domain signal Z, with reduced echo, then is output.

However, one problem with the RLS algorithm for computing the adaptive filter weights is that it has a high computational complexity. This complexity is on the order of $O(2N^2+6N)$ compared to $O(2N)$ for the least mean squares (LMS) where N=C*L, C is the number of playback channels, and L is the adaptive filter length in the subband. Previously, this computational complexity of RLS prohibited its use in AEC in practical systems. A paper by B. Hatty entitled, "Recursive Least Squares Algorithms using Multirate Systems for Cancellation of Acoustical Echoes" in 1990 International Conference on Acoustics, Speech, and Signal Processing, 3-6 Apr., 1990, vol. 2, pp. 1145-1148, was one of the first papers that discussed using a fast RLS (FRLS) for mono AEC. FRLS increases the speed and decreases the complexity of RLS by avoiding the use of a correlation matrix (or any other types of matrices). One problem, however, with FRLS is that it is quite unstable. As a result of this instability, the FRLS algorithm can quickly diverge. There have been several attempts to improve the stability of FRLS. However, to date, no one has come up with a satisfactory solution for the multi-channel AEC problem. Hatty, in an attempt to improve the stability of FRLS, proposed using a round robin scheme by resetting the entire FRLS algorithm periodically in a band-by-band fashion. What Hatty did was to completely reinitialized a band by throwing away the entire state of the algorithm and restarting it from scratch.

The problem with this reset technique, however, is that this resetting caused echo leakthrough for the band being reset, due to the FRLS algorithm having to reconverge and relearn the transfer function of the room after each reset. In addition, the Hatty technique caused distortion on the playback signal due to the fact that at any given time there was at least of portion of the algorithm is being reset.

In 1995, J. Benesty, J., et. al. in a paper entitled, "Adaptive Filtering Algorithms for Stereophonic Acoustic Echo Cancellation" in Proc. ICASSP'95, pp. 3099-3102 used fast RLS (FRLS) to try and solve the stereo AEC problem. However, the Benesty paper suggested using FRLS in the time domain instead of using adaptive subband filtering.

In another paper by J. Benesty, D. Morgan, and M. Sondhi entitled, "A Better Understanding and an Improved Solution to the Problems of Stereophonic Acoustic Echo Cancellation" in Proc. ICASSP'97, pp. 303-306, an update was proposed. In the Benesty '97 paper, in order to decorrelate the left channel from the right channel (which were very similar), Benesty added a nonlinearity to both channels. In one implementation, Benesty added the positive portion of the nonlinearity to one channel and the inverse (or negative) portion of the nonlinearity to the other channel. This introduced nonlinearity forced the channels to be different enough that the adaptive filters could learn the individual paths. In this way, the channels were decorrelated and made different enough so that the non-uniqueness problem associated with having to track the far-end transfer functions from the far-end person to far-end stereo microphones, as well as the near-end transfer functions from the near-end speakers to the near-end microphones, could be avoided.

The problem with adding a nonlinearity to the signal (as is done in the Benesty '97 paper) is that adding any type of the nonlinearity tends to distort the signal. Basically, adding a nonlinearity is adding distortion to the signal. Adding distortion, however, is undesirable if the AEC system is to work well with a system that involves music playback. Ideally, for music playback, the signal should be free of distortion so that the music is played back faithfully.

In the paper by P. Eneroth, S. Gay, T. Gansler, and J. Benesty entitled "A Real-Time Implementation of a Stereophonic Acoustic Echo Canceller" in IEEE Trans. On Speech and Audio Processing, Vol 9. no. 5, July 2001, pp. 513-523, a solution to the stereophonic AEC problem is proposed using FRLS in subbands and adding non-linearities to the playback channels. This paper attempts to increase stability by running parallel structures of the FRLS algorithm so that when one of the structures "blows up" or goes unstable, they can fall back on to another structure that is less than optimal. This implementation helps them reinitialize the algorithm.

In 1990, when the Hatty '90 paper proposed using FRLS for adaptive subband AEC processing, microprocessors were much slower than today's microprocessors. As a result, RLS was not a practical solution for the multi-channel AEC problem. However, with the significant increase in speed of modern microprocessors, RLS can now be used. However, the RLS algorithm will become unstable and diverge if the correlation matrix of the multi-channel playback signal becomes singular.

Therefore, what is needed is an echo cancellation system and method that can be used for a multi-channel playback signal. In addition, what is needed is a multi-channel echo cancellation system and method that avoids the use of FRLS to prevent the system from becoming unstable. In addition, what is needed is a multi-channel echo cancellation system and method that avoids the use of adding distortion to the playback signal. What is also needed is a multi-channel echo cancellation system and method that avoid and overcomes the problems of the RLS algorithm discussed above to effectively eliminate echo while retaining a faithful reproduction of the original signal.

SUMMARY OF THE INVENTION

The invention disclosed herein includes a multi-channel echo cancellation system and method having round robin regularization. The present invention can be used on both mono and multi-channels signals, and overcomes the above-mentioned deficiencies of current adaptive filter algorithms (such as RLS). In particular, the round robin regularization ensures that the adaptive filter algorithm does not become singular and blow up by regularizing the correlation matrix of the adaptive filter algorithm. This regularization is performed in a round robin fashion. In other words, the inverse correlation matrix of the subband playback data associated with each adaptive filter is regularized, in a round robin sequence, to prevent the inverse correlation matrix from diverging. In an alternative embodiment, each inverse correlation matrix is examined for divergence. If the inverse correlation matrix starts to diverge, then the matrix is regularized.

The multi-channel round robin regularization echo cancellation method includes obtaining a captured signal containing echo of a plurality of playback signals. The plurality of playback signals are decomposed into a plurality of subbands, and a plurality of adaptive filters are applied to the subbands. Each adaptive filter has an inverse correlation matrix. Next, each one of the plurality of adaptive filters is selected in a round robin sequence, so that every round each of the filters is selected. The inverse correlation matrix associated with each selected adaptive filter then is regularized. The regularized adaptive filter then is used to remove the echo from the captured signal.

Regularization of the inverse correlation matrix may be achieved by regularizing the correlation matrix. Thus, the inverse correlation matrix may be inverted, the correlation matrix then regularized, the regularized correlation matrix then inverted to yield a regularized inverse correlation matrix.

The correlation matrix may be regularized in at least two ways. One way is to add a small value to the diagonal elements of the correlation matrix every time the matrix is regularized. This ensures that the inverse correlation matrix does not diverge. Another way is to define a threshold value and examine each diagonal element of the correlation matrix. Anytime there is a danger of division by zero, then that diagonal element of the correlation matrix is set equal to the threshold value. If the correlation matrix diagonal element is greater than the threshold value, nothing is done to that element in the correlation matrix.

Regularization is implemented in a round robin manner. Each subband in the system is selected in turn so that the adaptive filter for that subband can be examined. This examination may include determining whether regularization is necessary at that time. The round robin scheme is used to make sure that each subband is examined on a regular basis. The round robin scheme may be implemented such that a single subband is examined for each frame. Alternatively, the round robin scheme may be implemented so that several or even all subbands per frame are examined. In addition, the round robin scheme may be implemented so that one subband every several frames is examined.

Another feature of the multi-channel echo cancellation system and method disclosed herein is dynamic switching between monaural and multi-channel echo cancellation. In particular, this feature provides dynamic switching between a mono AEC algorithm (such as normalized least mean square (NLMS)) and the invention's AEC algorithm for multiple channels with efficient reinitialization of the invention's echo cancellation algorithm. The switching is dynamic, such that little or no echo leaks through because of the efficient reinitialization of the RLS algorithm. This is achieved by sharing state variables and using a novel estimation technique to estimate the inverse correlation matrix for the RLS algorithm using the round robin regularization. This allows the invention to switch from NMLS (mono) back to RLS (multi-channel) without any echo leakage.

Still another feature of the multi-channel echo cancellation system and method disclosed herein is mixed processing for lower and upper subbands. In particular, in order to lower CPU resources requirements, round robin regularization RLS is used on the lower subbands while NLMS processing is used on the upper subbands. Both the plurality of playback signals and the captured signal are first divided into lower subbands (containing the lower frequencies of the signal) and the higher subbands (containing the higher frequencies of the signal). On the lower subbands, the RLS round robin regularization echo cancellation disclosed herein is used. On the higher subbands, the NLMS processing is used. NMLS uses less CPU resources and is used at the higher subbands because the stereo effect is attenuated at these frequencies. At lower frequencies, where the stereo effect is most noticeable, the superior RLS round robin regularization of the invention is used.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

Figure 1:
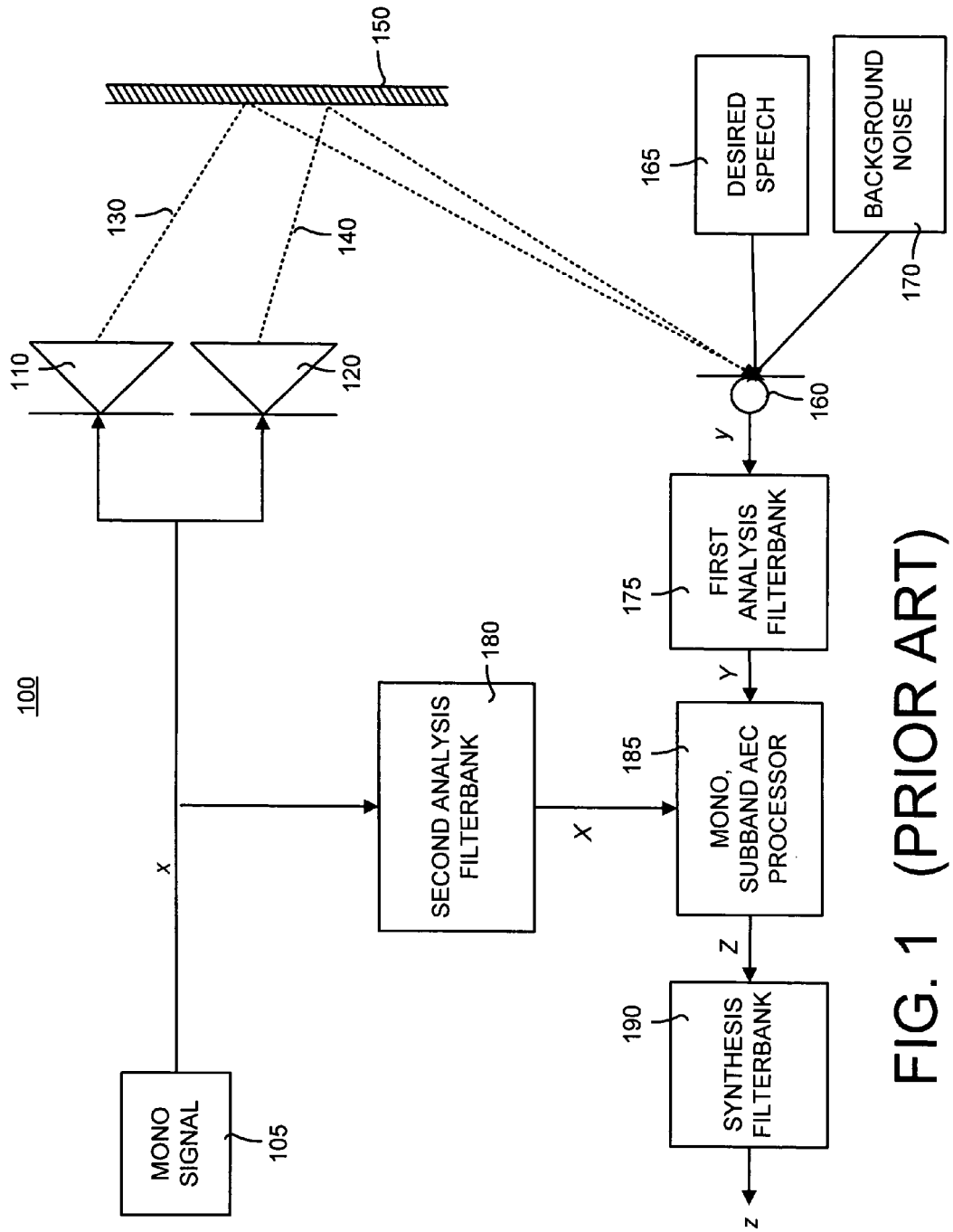
FIG. 1 illustrates a prior art single channel, acoustic echo cancellation (AEC) system used to process a mono, playback signal.
Figure 2:
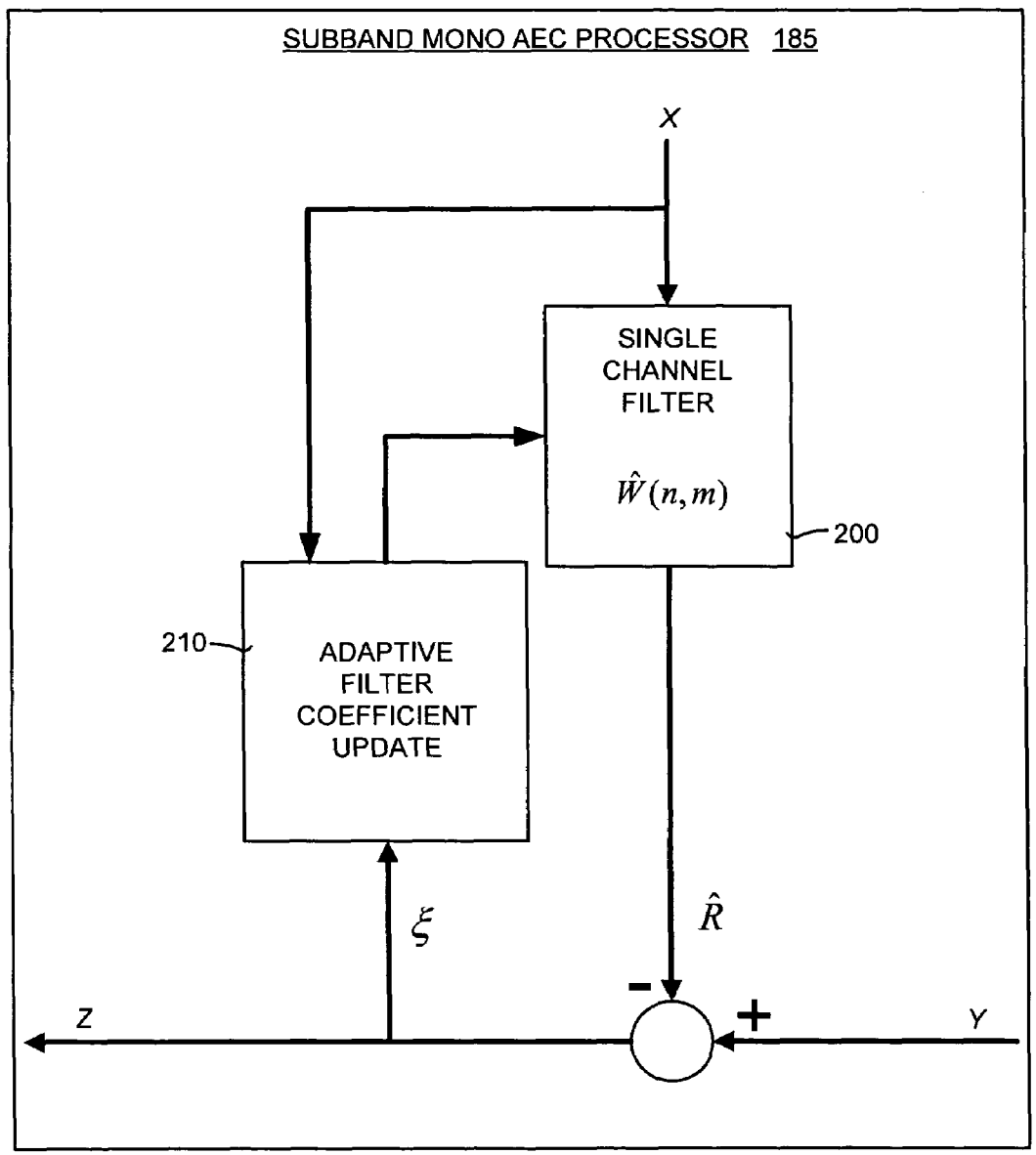
FIG. 2 is a detailed block diagram of the mono AEC processor shown in FIG. 1.
Figure 3:
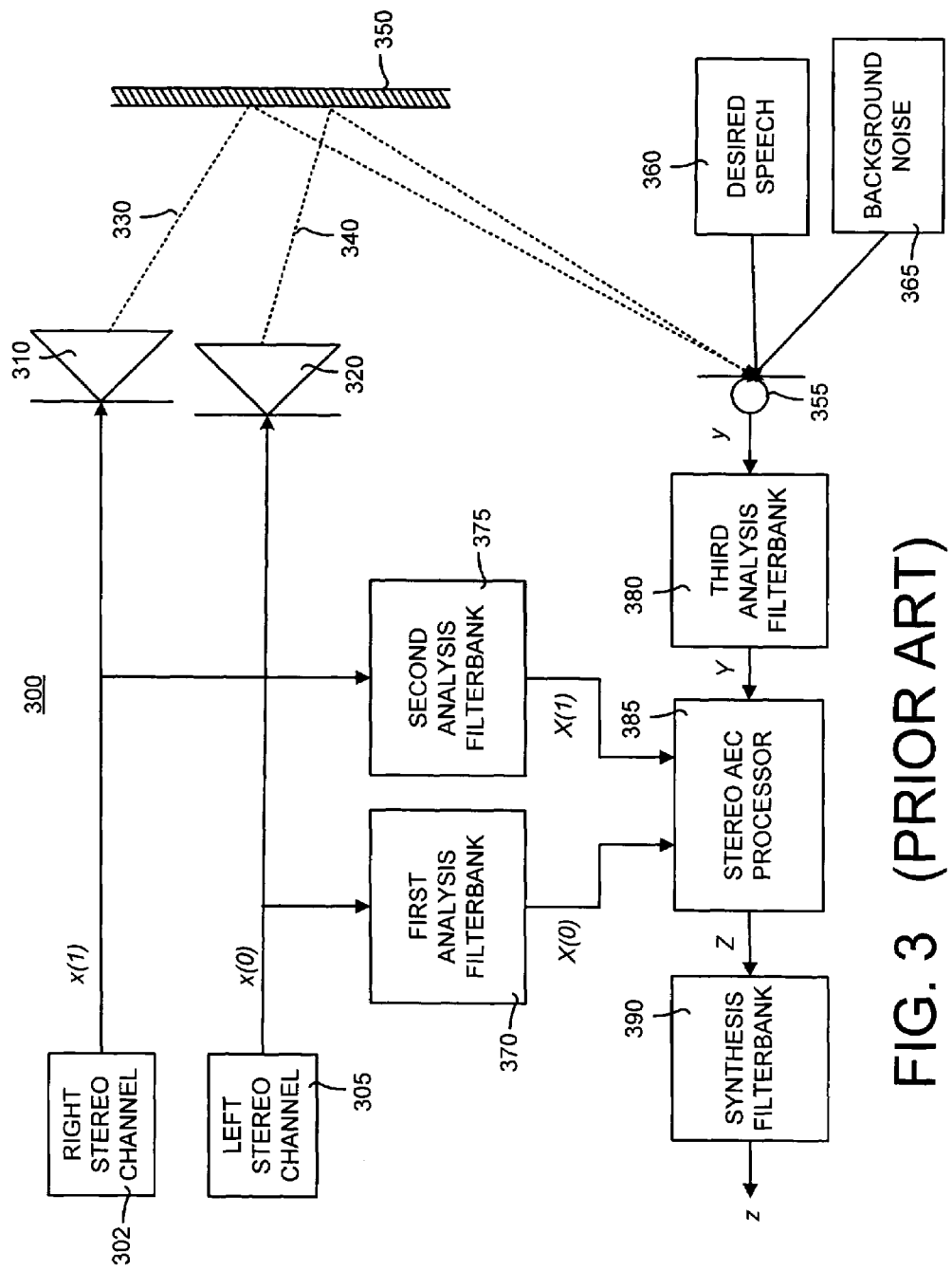
FIG. 3 illustrates a prior art stereo AEC system used to process a stereo playback signal.
Figure 4:
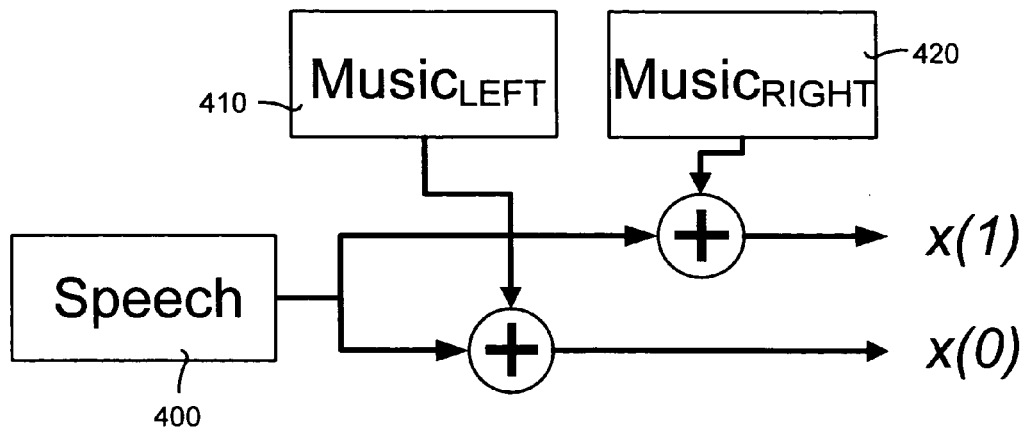
FIG. 4 illustrates the AEC system of FIG. 3 used with a voice communications system.
Figure 5:
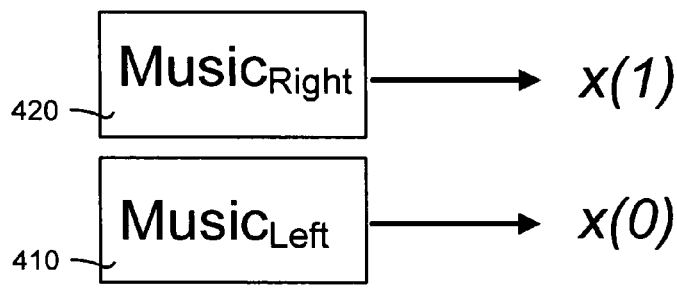
FIG. 5 illustrates the AEC system of FIG. 3 where the multi-channel playback signal includes stereo music.
Figure 6:
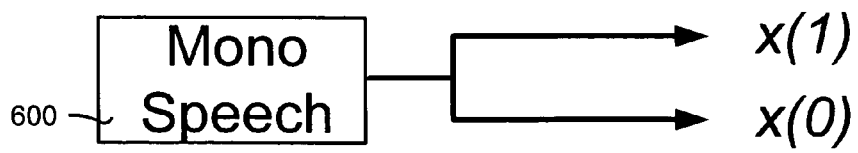
FIG. 6 illustrates the AEC system of FIG. 3 where the multi-channel playback signal includes mono speech.
Figure 7:
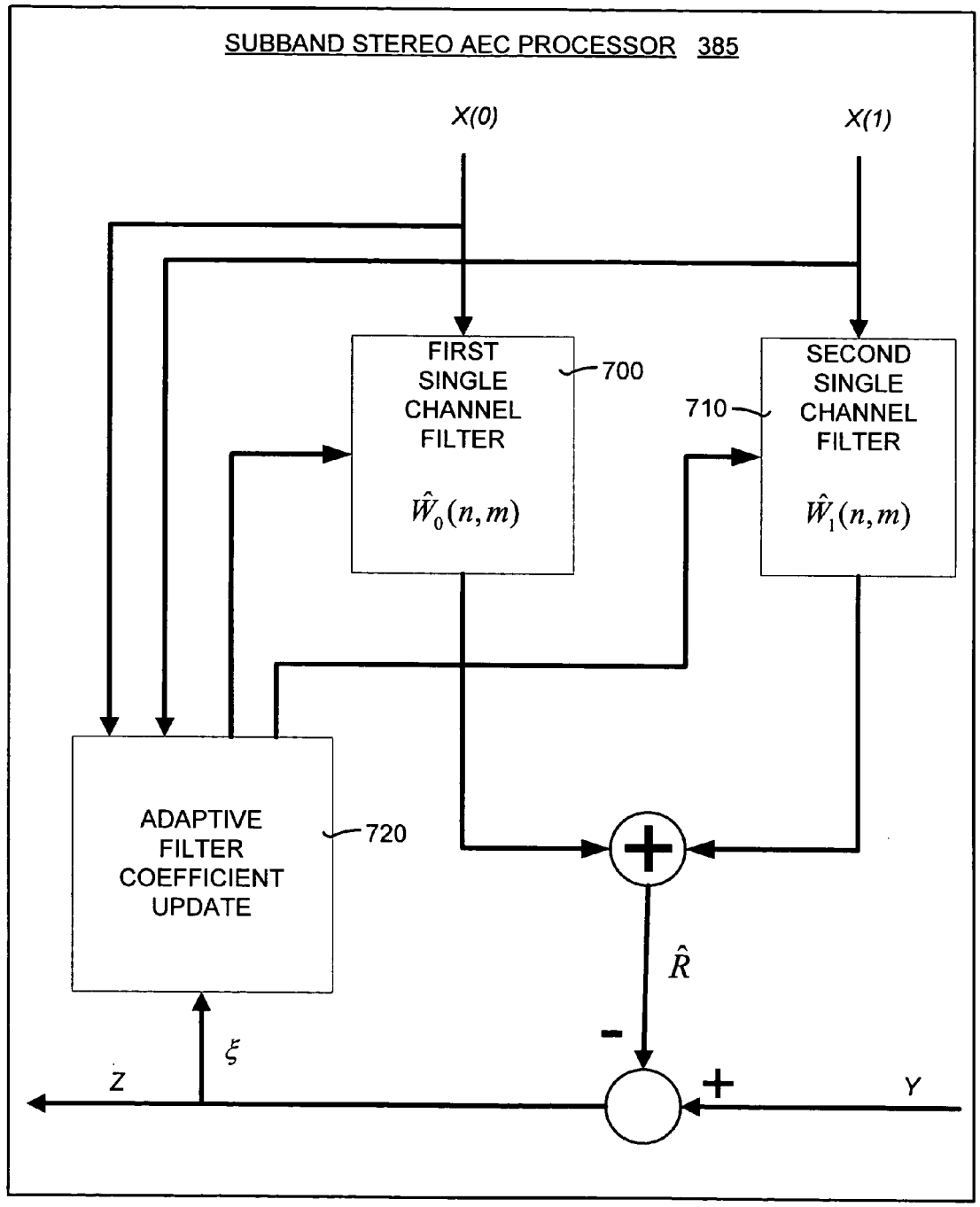
FIG. 7 is a detailed block diagram of the stereo AEC processor shown in FIG. 3.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Current techniques for echo cancellation of signals suffer from a variety of shortcomings. For example, normalized least mean squares (NLMS) is useful when the signal is a monaural signal, but does not work well on correlated, multi-channel playback signals. Processing the multi-channel playback signal with a non-linearity decorrelates the individual channels but adds undesirable distortion to the playback signals. This is unacceptable when the playback signals contains music that a user would like to hear in its original, undistorted version. Recursive least squares (RLS) and fast recursive least squares (FRLS) also help to decorrelate multi-channel playback signals. However, FRLS can be extremely unstable. RLS is computationally intensive and can become unstable for highly correlated playback signals.

The multi-channel round robin regularization echo cancellation method and system disclosed herein overcome these problems of current methods. The multi-channel round robin regularization echo cancellation method processes a multi-channel playback signal (such as an acoustic signal)

by using a plurality of recursive least squares (RLS) adaptive filters and using a round robin regularization scheme to ensure that the RLS algorithm remains stable. Stability is ensured by regularizing the inverse correlation matrix in the RLS algorithm in a round robin manner on a subband-by-subband basis. Essentially, the round robin regularization ensures that the determinant of the inverse correlation matrix for the RLS adaptive filters on each of the plurality of subbands does not "blow up" (or attain a large value).

The multi-channel round robin regularization echo cancellation method and system provides a novel way to prevent the inverse correlation matrix from diverging thereby causing the RLS adaptive filter to diverge. The inverse correlation matrix is periodically regularized for each subband based on a round robin scheme in order to ensure the algorithm does not diverge when the channels of the speaker signal are dependent.

The multi-channel round robin regularization echo cancellation method and system also includes a novel feature that allows dynamic switching between a multi-channel, subband echo cancellation process (such as the RLS round robin regularization method described herein) and single channel, subband echo cancellation process (using an adaptive filtering algorithm such as normalized least mean squares (NLMS)). The dynamic switching is achieved with efficient reinitialization of either process, to minimize distortion when switching from multi-channel processing to monaural processing and vice versa. The multi-channel round robin regularization echo cancellation method and system also includes another feature of one type of processing the lower subbands using RLS and NLMS on upper subbands. This allows the multi-channel round robin regularization echo cancellation method and system to run in environments where processing power is limited.

II. General Overview

Figure 8:
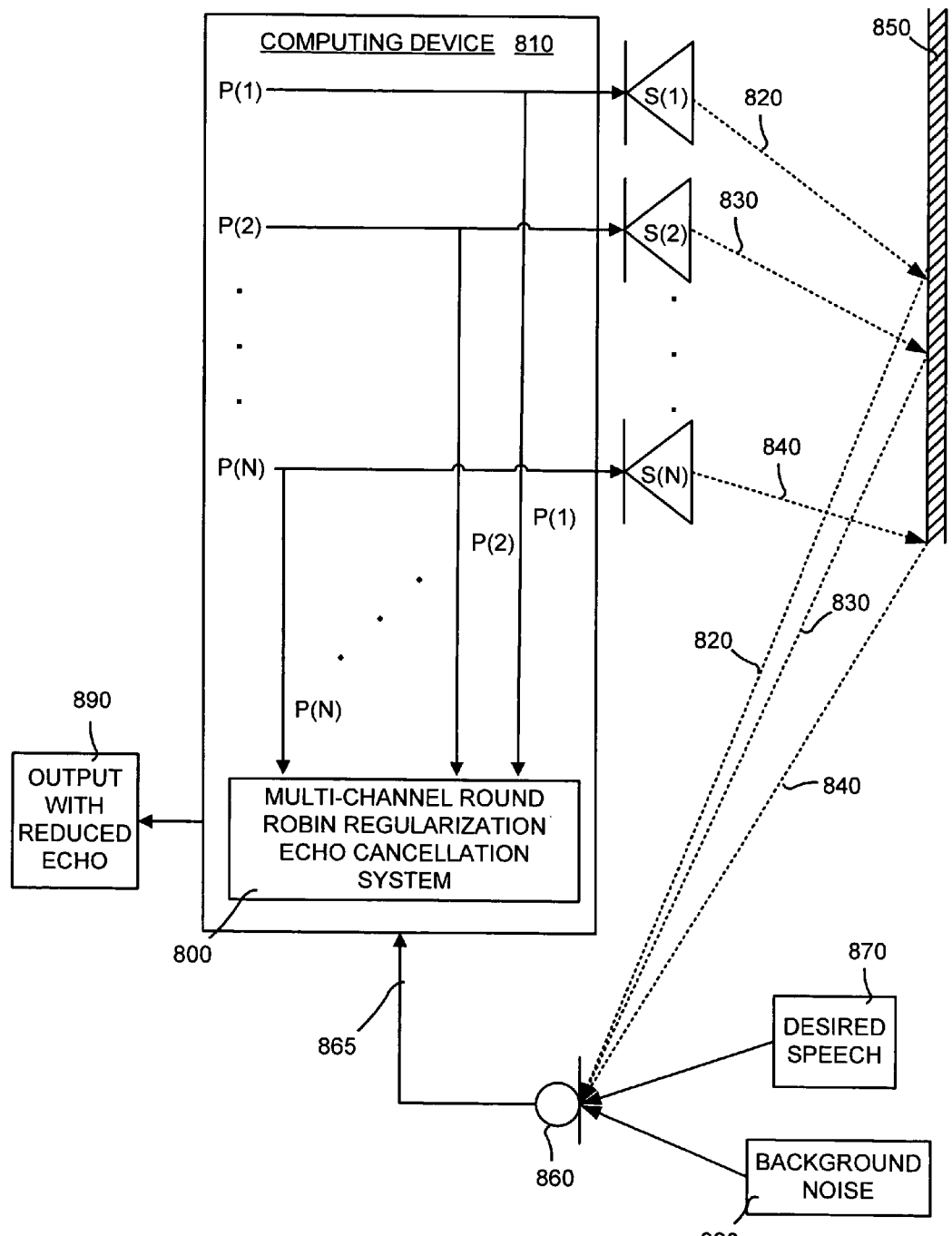
FIG. 8 is a block diagram illustrating an exemplary implementation of the multi-channel round robin regularization echo cancellation system and method disclosed herein.

FIG. 8 is a block diagram illustrating an exemplary implementation of the multi-channel round robin regularization echo cancellation system and method disclosed herein. It should be noted that FIG. 8 is one of several ways in which the multi-channel round robin regularization echo cancellation system and method may implemented and used.

Referring to FIG. 8, multi-channel round robin regularization echo cancellation system 800 resides on a computing device 810. In FIG. 8, playback signals P(1), P(2) to P(N) are generated internally (such as music from a compact disk) by the system 800. In an alternate embodiment, playback signals P(1), P(2) to P(N) are external and received (such as via input audio jacks) by the system 800. Each playback signal is played back over its respective speaker, so that P(1) is played back through speaker S(1), P(2) is played back through speaker S(2), and so forth. In addition, the playback signals P(1) to P(N) are obtained and input into the multi-channel round robin regularization echo cancellation system 800.

As shown by the dotted lines in FIG. 8, the output of the speakers S(1) to S(N) causes echoes 820, 830, 840 to be reflected off a wall 850 of a room (not shown). These echoes 820, 830, 840 are picked up by a microphone 860. In addition, the microphone picks up desired speech 870 and background noise 880. The signal from the microphone 865, also called the "captured signal", along with the outputs of the playback signal P(1) to P(N), are input to the multi-channel round robin regularization echo cancellation system 800. After processing by the multi-channel round robin regularization echo cancellation system 800, a new output signal 890 is generated. Output signal 890 is the captured signal 865 with echoes of speaker signals 820, 830, and 840 reduced.

It should be noted that the invention is not limited to acoustic signals. In general, there may be N transmitters S(1) through S(N) and one receiver 860, and the multi-channel round robin regularization echo cancellation system will reduce the amount of transmitted signal in the output signal 890.

It should also be noted that the invention is not limited to a single receiver or microphone 860. The computing device 810 may be connected to a plurality of receivers 860, producing a plurality of signals 865. Each of the plurality of signals 865 would be operated on by an single independent instance of the multi-channel round robin regularization echo cancellation system 800. Each of those single instances would then produce a single output with reduced echo 890.

III. Exemplary Operating Environment

The multi-channel round robin regularization echo cancellation system and method are designed to operate in a computing environment and on a computing device, such as the computing device 810 shown in FIG. 8. The computing environment in which the multi-channel round robin regularization echo cancellation system and method operates will now be discussed. The following discussion is intended to provide a brief, general description of a suitable computing environment in which the multi-channel round robin regularization echo cancellation system and method may be implemented.

Figure 9:
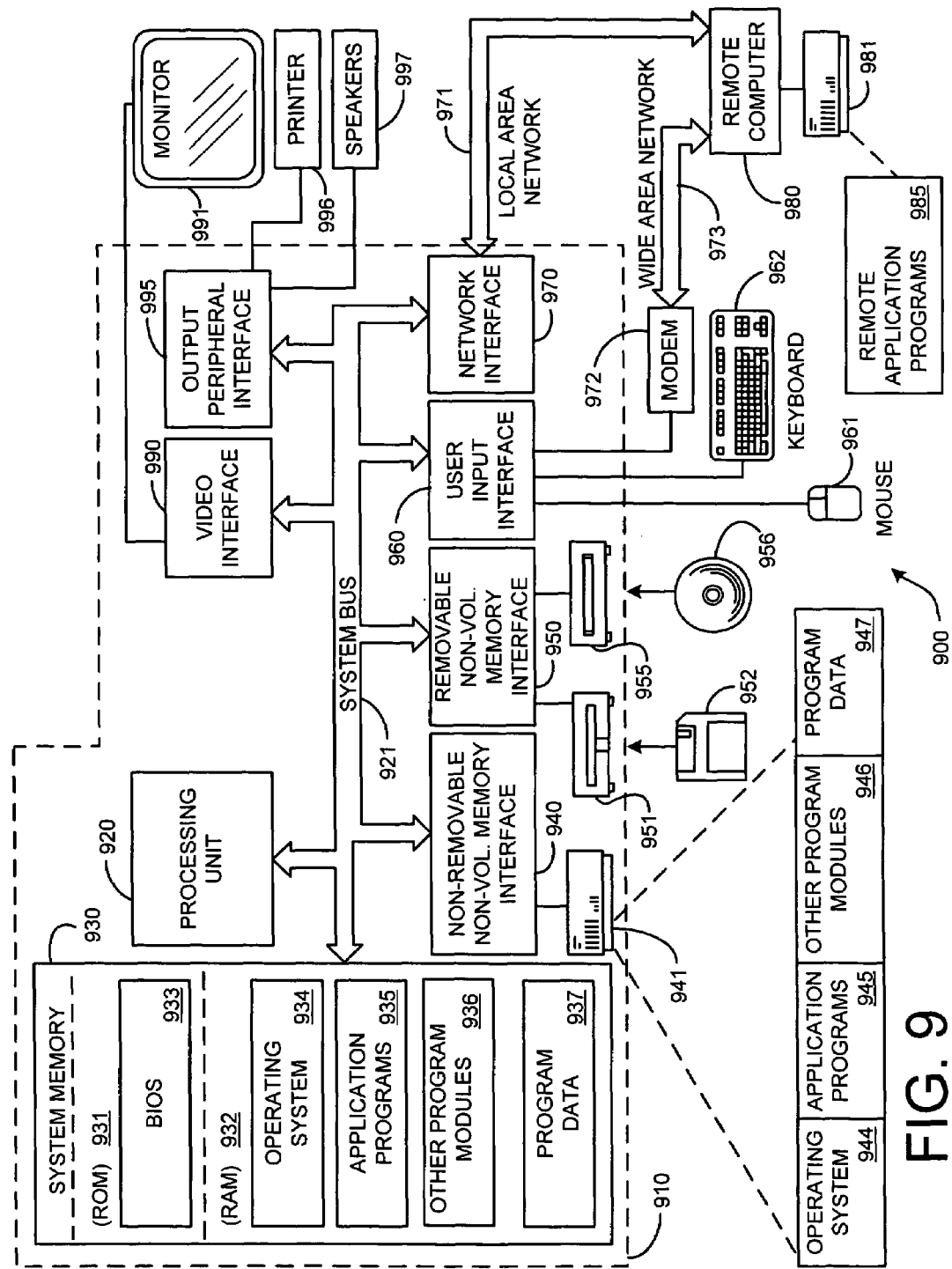
FIG. 9 illustrates an example of a suitable computing system environment in which the multi-channel round robin regularization echo cancellation system and method shown in FIG. 8 may be implemented.

FIG. 9 illustrates an example of a suitable computing system environment in which the multi-channel round robin regularization echo cancellation system and method shown in FIG. 8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The multi-channel round robin regularization echo cancellation system and method is operational with numerous other general purpose or special purpose computing system environments or configurations. Examples of well known computing systems, environments, and/or configurations that may be suitable for use with the multi-channel round robin regularization echo cancellation system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The multi-channel round robin regularization echo cancellation system and method may be described in the general context of computer-executable instructions, such as program modules, being executed by a computer. Generally, program modules include routines, programs, objects, components, data structures, etc., that perform particular tasks or implement particular abstract data types. The multi-channel round robin regularization echo cancellation system and method may also be practiced in distributed computing environments where tasks are performed by remote processing devices that are linked through a communications network. In a distributed computing environment, program modules may be located in both local and remote computer storage media including memory storage devices. With reference to FIG. 9, an exemplary system for implementing the multi-channel round robin regularization echo cancellation system and method includes a general-purpose computing device in the form of a computer 910.

Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer readable media. Computer readable media can be any available media that can be accessed by the computer 910 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 910. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within the computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 920 through a user input interface 960 that is coupled to the system bus 921, but may be connected by other interface and bus structures, such as, for example, a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

IV. Operational Overview

Figure 10:
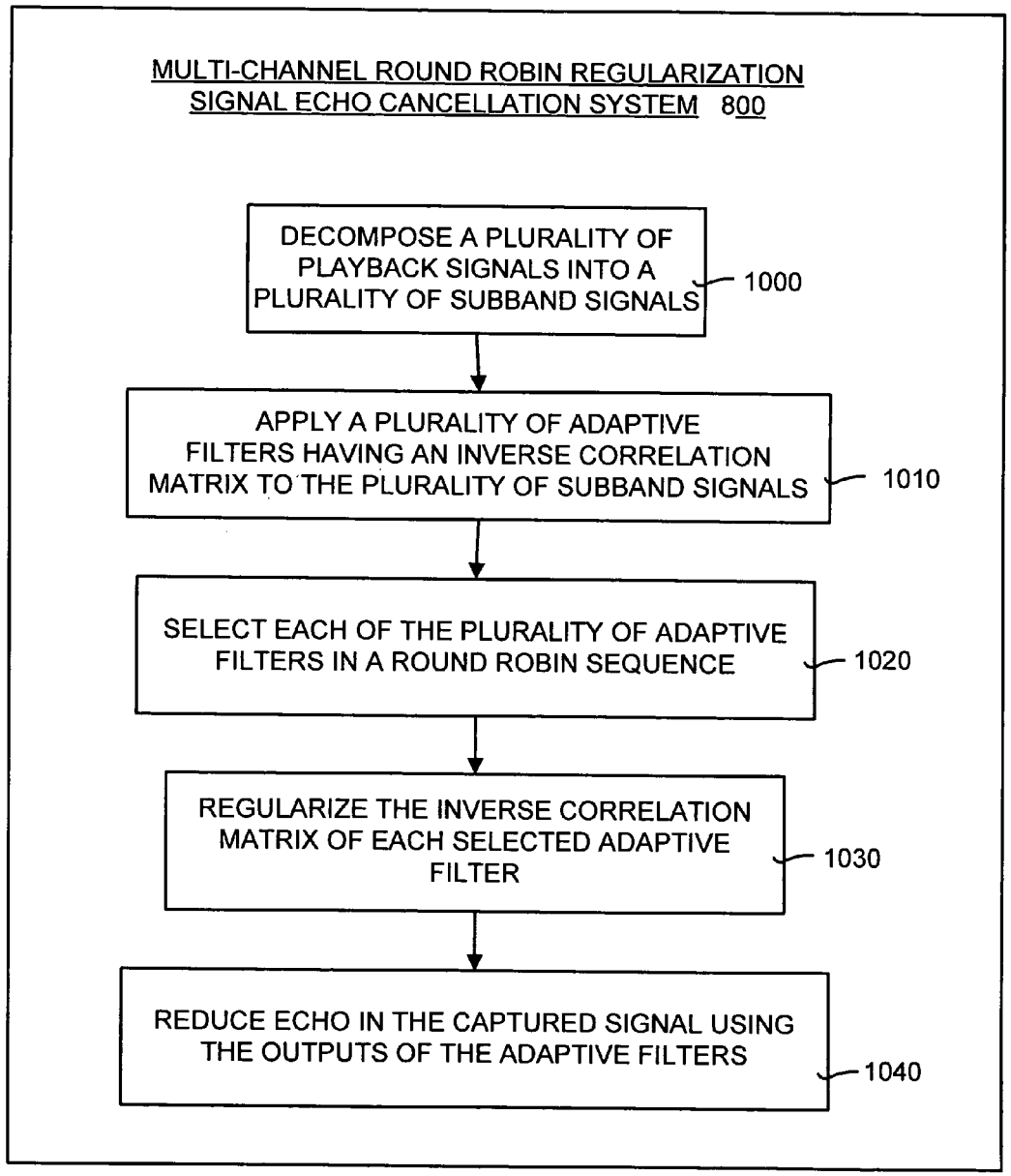
FIG. 10 is a general flow diagram illustrating the general operation of the multi-channel round robin regularization echo cancellation system shown in FIG. 8.

The operation of the multi-channel round robin regularization echo cancellation system 800 shown in FIG. 8 now will be discussed. FIG. 10 is a general flow diagram illustrating the general operation of the multi-channel round robin regularization echo cancellation system shown in FIG. 8. The multi-channel round robin regularization echo cancellation method begins by decomposing a plurality of playback signals into a plurality of subband signals (box 1000). Each of these signals can correspond to a channel of playback. Next, a plurality of adaptive filters, each having an inverse correlation matrix, are applied to the plurality of subband signals (box 1010). Each of the plurality of adaptive filters is selected in a round robin sequence, such that each of the filters is selected in turn (box 1020). The inverse correlation matrix associated with each selected adaptive filter then is regularized (box 1030). As explained in detail below, regularization means processing the inverse correlation matrix such that the determinant of the correlation matrix is not close to zero. The regularized adaptive filter then is used to reduce the echo in the captured signal 865 from the plurality of playback signals (box 1040).

V. Operational Details and Working Example

The multi-channel round robin regularization echo cancellation method shown in FIG. 10 uses a round robin scheme and regularization to ensure that the adaptive filters in the echo cancellation algorithm do not diverge when the playback channels are dependent. As noted above, the method includes implementing a round robin scheme of selecting each adaptive filter of a subband and then regularizing the inverse correlation matrix for that selected adaptive filter. Together, the round robin scheme and the regularization process make up the round robin regularization process of the multi-channel round robin regularization echo cancellation method. Various ways of implementing the round robin scheme and regularization will now be discussed. The discussion includes exemplary working examples of tested implementations of a round robin scheme and a regularization process. In particular, a exemplary working example is presented of the multi-channel round robin regularization echo cancellation method using round robin regularization in a recursive least squares (RLS) algorithm. It should be noted that this working example is only one way in which the round robin regularization process may be implemented.

Mathematical Description of the Adaptive Filtering Processes

For a single channel of playback data, the NLMS algorithm with regularization is as follows:

For each frame of audio data, n=1, 2, . . . , and each subband m=0 . . . M−1, compute, $$\xi(m) = Y(n, m) - \hat{W}^H(n, m) X(n, m) \quad (1)$$

$$\hat{W}(n+1, m) = \hat{W}(n, m) + \frac{\mu}{P_{Est}(n, m) + \beta_{NLMS}} X(n, m) \xi^*(m) \quad (2)$$

where $\xi$ the error signal between the microphone signal, $Y(n,m)$ is the estimated echo, $\xi^*$ is the conjugate of the error signal, $$\hat{W}(n,m) = [\hat{W}(n,m,0)\ \hat{W}(n,m,1) \ldots \hat{W}(n,m,L-1)]^T$$

is the estimated echo filter coefficients in the transform domain, L is the number of taps in the estimated echo filter, $$X(n,m) = [X(n,m)\ X(n-1,m) \ldots X(n-L+1, m)]^T \quad (3)$$

is a column vector of the most recent L frequency domain playback samples, $\mu$ is the step size, $\beta_{NLMS}$ is the regularization factor, and $P_{Est}(n,m)$ is the estimate of the power in the $m^{th}$ band. For example, $P_{Est}(n,m)$ can be found as $$P_{Est}(n,m) = (1-\alpha) P_{Est}(n,m) + \alpha \|X(n,m)\|^2$$

where $\|X(n,m)\|^2$ is the square of the magnitude of the complex speaker signal $X(n,m)$ and $\alpha$ is the averaging parameter.

When dividing one number by a second number, regularization is the process of adding or subtracting a small value to the denominator to ensure the denominator never becomes zero and causes the fraction to become infinite. In equation (2), $\beta_{NLMS}$ is the regularization factor that ensures that the denominator never goes to zero. $\beta_{NLMS}$ is added to $P_{Est}(n,m)$ since $P_{Est}(n,m)$ is a power estimate and is always positive. An alternative way to regularize the fraction is to set the denominator to some threshold if the denominator is positive and less than the threshold.

One problem with using the NLMS algorithm for multi-channel playback signals is that NLMS does not work very well. This is because the cross-channel correlation of the multi-channel playback signal significantly slows down the convergence of the adaptive filters. Recursive least squares (RLS) is an alternative algorithm for adjusting the parameters (or weights) of the adaptive filters. One of the main benefits of RLS is that it tends to decorrelate the channels. Since RLS recursively computes an estimate of the inverse of a correlation matrix of the multi-channel input speaker data, it can learn the correlation between the speaker channels and quickly converge to the correct solution. For multi-channel speaker signals, the RLS algorithm is as follows:

$$P(0,m) = \delta^{-1} I$$

$$\hat{W}(1,m) = 0$$

For each frame n=1, 2, . . . and subband m=0 . . . M−1, compute $$K(m) = \frac{\lambda^{-1} P(n-1, m) X(n, m)}{1 + \lambda^{-1} X^H(n, m) P(n-1, m) X(n, m)} \quad (4)$$

$$\xi(m) = Y(n, m) - \hat{W}^H(n, m) X(n, m) \quad (5)$$

$$\hat{W}(n+1, m) = \hat{W}(n, m) + K(m) \xi^*(m) \quad (6)$$

$$P(n, m) = \lambda^{-1} P(n-1, m) - \lambda^{-1} K(m) X^H(n, m) P(n-1, m) \quad (7)$$

where δ is a small constant, I is the identity matrix, $$K(m) = [K(m,0) \ldots K(m,C*L-1)]^T$$

is the multi-channel Kalman gain vector, C is the number of playback channels, L is the filter length in the subband, $$X(n,m) = [X(n,m,0) \ldots x(n,m,C-1) \, X(n-1,m,0) \ldots X(n-L+1,m,C-1)]^T \quad (8)$$

is the multi-channel speaker input vector, P(n,m) is the inverse of the input speaker signal correlation matrix R(n, m), $$R(n, m) = \sum_{i=0}^{n} \lambda^{n-i} X(n, m) X^H(n, m) \quad (9)$$

λ is the exponential forgetting factor, $$\hat{W}(n,m) = [\hat{W}(n,m,0) \ldots \hat{W}(n,m,C-1) \, \hat{W}(n-1,m,0) \ldots \hat{W}(n-L+1,m,C-1)]^T$$

is the weight vector, and ξ* is the conjugate of the error.

It should be noted that the RLS adaptive filter stores and updates the inverse correlation matrix P for every subband. This is referred to in this document as "having an inverse correlation matrix."

Round Robin Scheme

In general, the round robin scheme as used in the multi-channel round robin regularization echo cancellation method ensures that each subband in the system is selected so that the adaptive filter for that subband can be regularized. Alternatively, the adaptive filter can be examined to determine whether regularization is necessary at that time. The round robin scheme is used to make sure that each subband is examined on a regular basis.

The round robin scheme may be implemented in a variety of different ways. By way of example, and not limitation, a round robin scheme can be described as where a single subband is regularized each frame. Alternatively, the round robin scheme may include regularizing several or even all subbands per frame. In another implementation, the round robin scheme may include regularizing one subband every several frames. Depending on the actual round robin scheme implemented, a counter that is pointing to the current subband being examined is updated to point at the next subband or group of bands being examined and reset back to the first band if necessary.

Figure 11:
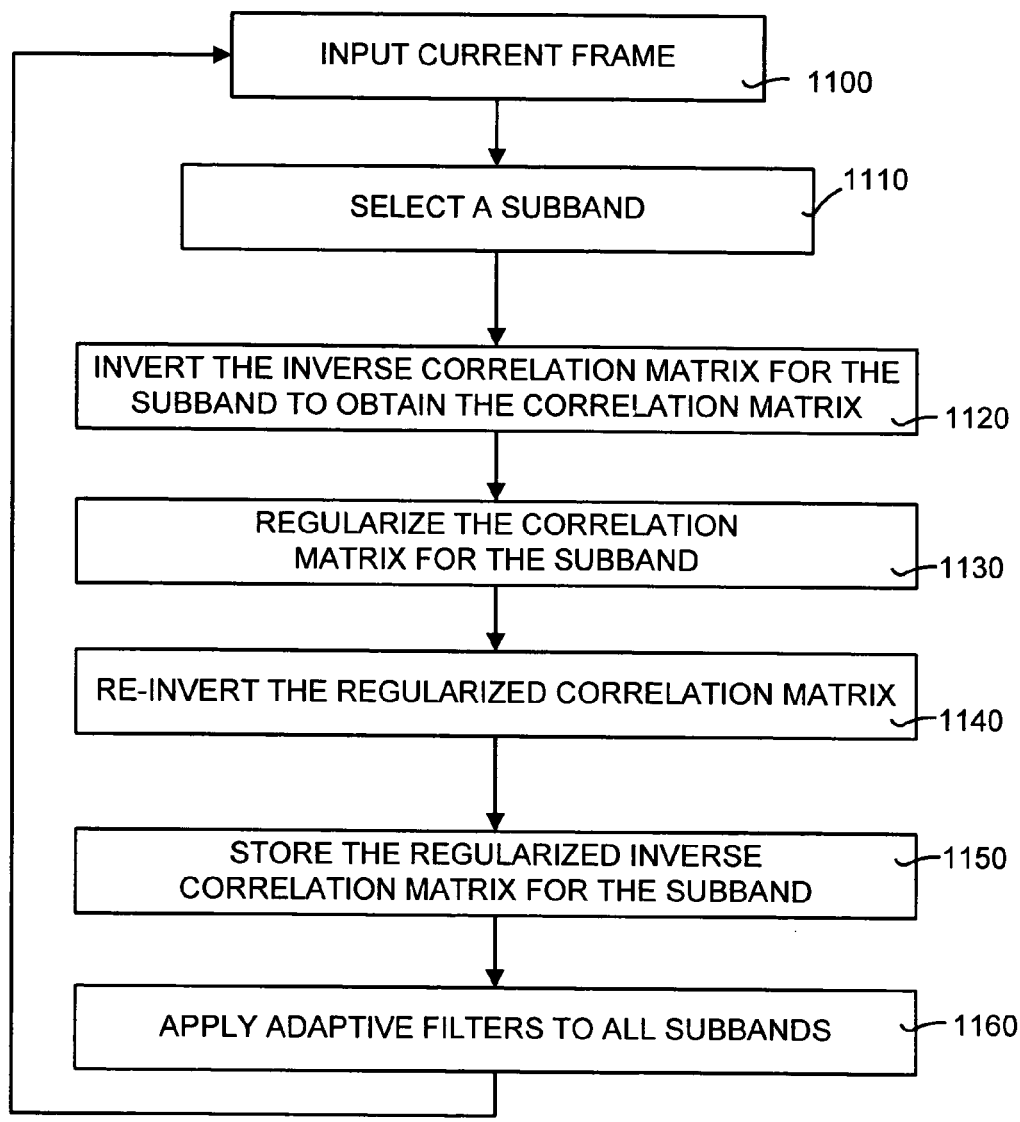
FIG. 11 is a general flow diagram illustrating an exemplary implementation of a round robin scheme of the multi-channel round robin regularization echo cancellation method shown in FIG. 10.

FIG. 11 is a general flow diagram illustrating an exemplary implementation of a round robin scheme of the multi-channel round robin regularization echo cancellation method shown in FIG. 10. As shown in FIG. 11, the round robin scheme begins by inputting a current frame (box 1100). One subband is then selected for regularization (box 1110). In this embodiment, each subband is selected in turn as a new current frame is input. However, in alternative embodiments, a single subband may only be selected every few frames, or several subbands may be selected per frame.

The inverse correlation matrix for the selected subband is inverted to obtain the correlation matrix for the selected subband (box 1120). The correlation matrix is then regularized (box 1130). In an alternative embodiment, box 1130 first examines the correlation matrix to determine whether it needs to be regularized, and then regularizes only when necessary. Next, the regularized correlation matrix is re-inverted (box 1140), and the regularized inverse correlation matrix for the selected subband is stored (box 1150). Finally, all of the adaptive filters for all of the subbands are applied to the plurality of subband, playback signals to reduce echo in the captured signal (box 1160). Control then flows back to box 1100, which obtains the next current frame.

Round Robin Regularization

In order to more fully understand the round robin regularization process disclosed herein, the following discussion is provided. The discussion includes an exemplary working example of a tested implementation of the round robin regularization process in a recursive least squares (RLS) algorithm. It should be noted that this working example is only one way in which the round robin regularization process may be implemented.

In general, the round robin regularization process keeps the correlation matrix for each adaptive filter from becoming singular. This regularization ensures that the inverse correlation matrix will not become unstable. In an exemplary implementation, round robin regularization was used with an RLS algorithm. The details of this implementation are as follows.

In general, RLS is a fast method to solve the normal equation $$w^o = R^{-1} p$$

where $w^o$ is the optimal weight vector, R is the correlation matrix for the input speaker data given in equation (9), and p is the cross-correlation vector between the input speaker data and the microphone data $$p(n, m) = \sum_{i=0}^{n} \lambda^{n-i} X(n, m) Y^H(n, m).$$

If R starts to become singular, then the values in its inverse become very large and a valid estimate of the weight vector cannot be found. The correlation matrix becomes singular if either its rows or the columns are dependent. This condition occurs when one channel of audio data is a linear transformation of another channel. For example, the correlation matrix is singular if one channel is equal to another channel multiplied by some gain. This example corresponds to a mono signal being panned across the speakers in the system. For a purely mono signal, the signals played to each speaker are identical and the gain between the channels equals 1. In both of these examples, the correlation matrix quickly becomes singular depending on the value of the forgetting factor and how long the mono signal has been played.

In order to prevent the correlation matrix from becoming singular, the round robin regularization process is used to regularize the correlation matrix for a particular subband. As described above, regularization involves ensuring that the denominator of a fraction never gets too close to zero, thereby preventing the value of the fraction from becoming too large.

Regularization of the correlation matrix R, can be achieved in a variety of different ways. Since the diagonal elements of the correlation matrix are non-negative, the invention only needs to regularize positive or zero elements of the diagonal correlation matrix. By way of example and not limitation, the correlation matrix can be regularized by doing the following: (1) adding a small value to the diagonal elements of the correlation matrix; and (2) setting values on the diagonal that are close to zero to a small threshold. The latter technique defines a threshold value and examines each element of the correlation matrix. Anytime there is a danger of division by zero (such as when the element being examined gets smaller than the threshold value), then that element of the correlation matrix is set equal to the threshold value. The threshold value is a small number that is greater than zero. If the correlation matrix element is greater than the threshold value, nothing is done to that element in the correlation matrix.

The first regularization technique that involves adding a small value to the diagonal elements of the correlation matrix can be summarized mathematically as:

$$R(n,m)=P^{-1}(n,m)$$

$$R(n,m)=R(n,m)+\beta_{RSL}I$$

$$P(n,m)=R^{-1}(n,m)$$

where $R(n,m)$ is the correlation matrix, $P^{-1}(n,m)$ is the inverse of the inverse correlation matrix, $\beta_{RLS}$ is the regularization factor, and I is the identity matrix. $\beta$RLS can be a small constant (such as 1500 with 16-bit input data), or $\beta_{RLS}$ can be chosen using other non-uniform techniques. By regularizing each subband in a round robin scheme, the central processing unit (CPU) consumption involved with the two matrix inverses can be minimized.

As described above, the round robin scheme can be implemented where a single band or several bands are regularized per frame or one band is regularized every several frames. Depending on the actual round robin scheme, the counter which points to the current band to be regularized is updated to point to the next band or group of bands to be regularized and reset back to the first band if necessary. Since R and P are symmetric, a Cholesky decomposition can be used to find R from $P^{-1}$ instead of LU decomposition, which requires twice as many operations. However, in a test implementation the LU decomposition was used with partial pivoting to compute the inverse instead of Cholesky decomposition due to its numerical properties. Furthermore, this regularization process was computed using double precision mathematics to achieve acceptable performance for the matrix inversions.

As a result, the new RLS algorithm with round-robin regularization is as follows:

$$P(0,m)=\delta^{-1}I$$

$$\hat{W}(1,m)=0$$

RoundRobinCount=0

For each frame n=1, 2, . . . and subband m=0 . . . M-1, compute $$K(m) = \frac{\lambda^{-1}P(n-1,m)X(n,m)}{1+\lambda^{-1}X^H(n,m)P(n-1,m)X(n,m)}$$

RoundRobinCount=RoundRobinCount+1

If (RoundRobinCount==MaxRoundRobinCount)
    RoundRobinCount=0
end

In this embodiment of the invention, MaxRoundRobinCount is selected to be equal to the number of subbands in the mixed subband processing described below. Selecting a value for MaxRoundRobinCount depends upon the value of the exponential forgetting factor $\lambda$. The value of $\lambda$ is usually chosen as a trade off between convergence accuracy of the RLS solution and tracking speed. If $\lambda$ is very close to 1, the RLS algorithm will obtain very accurate tap weights and hence cancel most of the echo provided nothing moves in the near end room. However, if something or someone does move, then the RLS algorithm cannot track the changes in the acoustic environment quickly. The value of MaxRoundRobinCount should be chosen such that the inverse correlation matrix of the speaker signal is regularized often enough so that $\lambda^{MaxRoundRobinCount}$ does not reach a value that is too small. If $\lambda^{RoundRobinCount}$ is too small, the inverse correlation matrix will become singular between round robin updates. In this case, the inverse correlation matrices of multiple subbands will need to be regularized per frame to increase the frequency of when the inverse correlation matrix for each subband is regularized.

Figure 12:
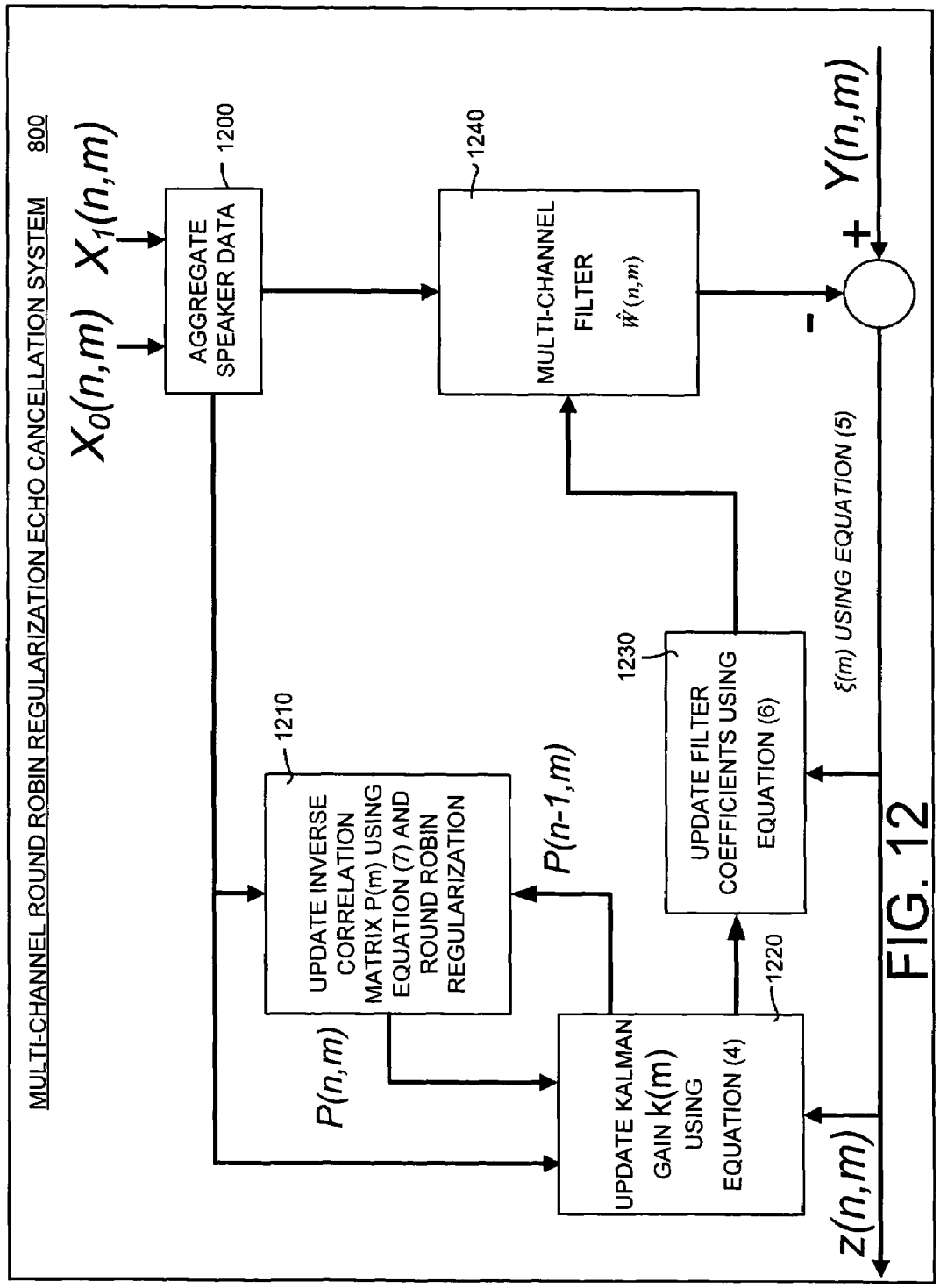
FIG. 12 is a block/flow diagram illustrating an exemplary implementation of the multi-channel round robin regularization echo cancellation system and method shown in FIG. 8.

FIG. 12 is a block/flow diagram illustrating an exemplary implementation of the multi-channel round robin regularization echo cancellation system 800 and method shown in FIG. 8. This exemplary implementation uses the round robin regularization technique set forth above. FIG. 12 shows the implementation using one multi-channel filter per subband, operating on aggregated data. In particular, referring to FIG. 12, subband signals from the multiple playback channels are aggregated into a single vector (box 1200). Using this aggregated vector, the inverse correlation matrix is updated using equation (7) and the round robin regularization (box 1210). The aggregated subband signals and the inverse correlation matrix are used to update the Kalman gain using equation (4) (box 1220). The Kalman gain is used to update the filter coefficients using equation (6) (box 1230). These filter coefficients are sent to the multi-channel filter (box 1240), applied to the aggregated vector. The process continues recursively at every step. At every step, the current state of the multi-channel filters is used to reduce the echo in the multi-channel signal. The captured signal with reduced echo is output.

Figure 13:
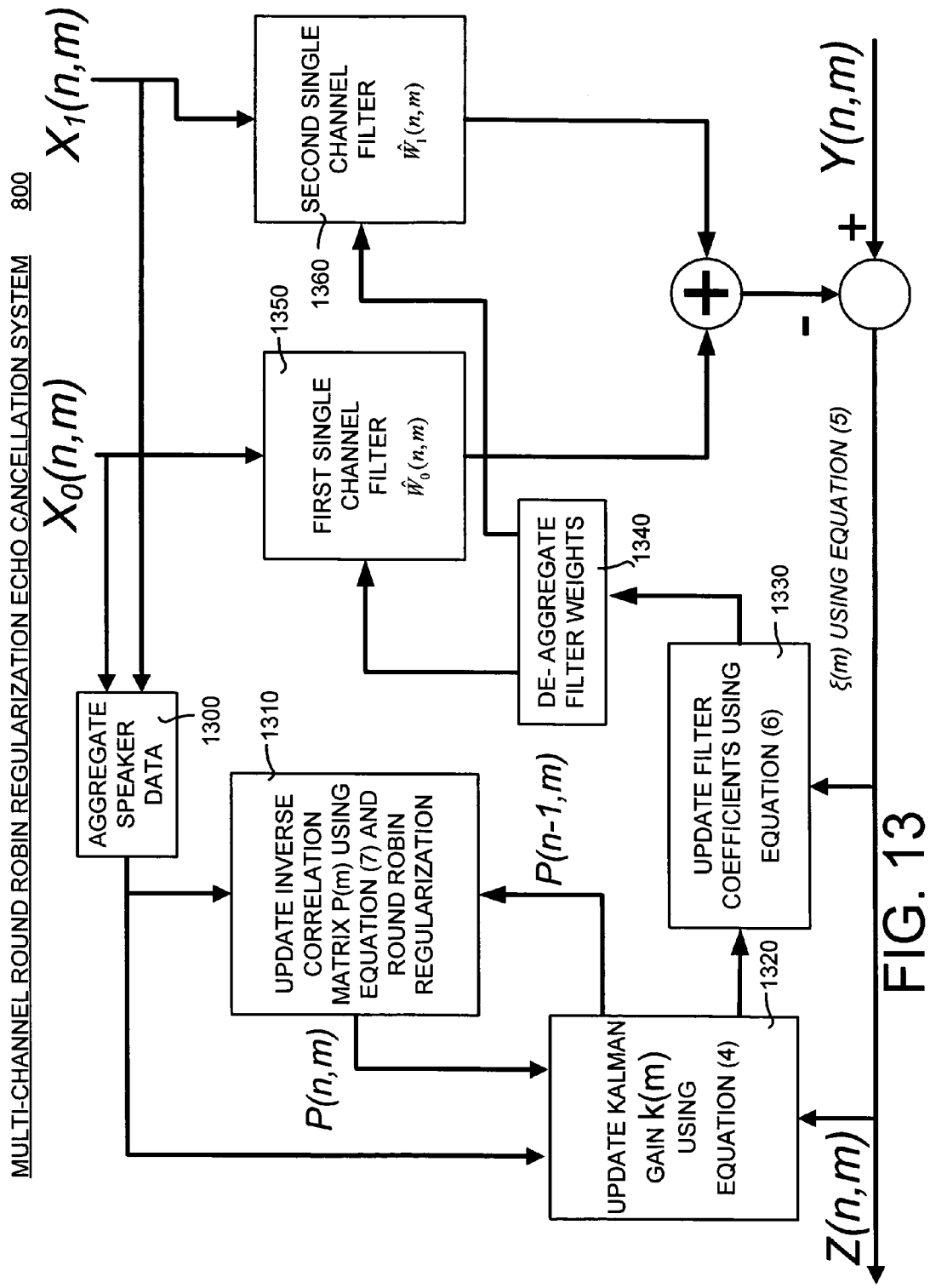
FIG. 13 is a block/flow diagram illustrating another exemplary implementation of the multi-channel round robin regularization echo cancellation system and method shown in FIG. 8.

FIG. 13 is a block/flow diagram illustrating another exemplary implementation of the multi-channel round robin regularization echo cancellation system 800 and method shown in FIG. 8. This exemplary implementation uses the round robin regularization technique set forth above and implements each multi-channel adaptive filter of FIG. 12 as a plurality of single-channel filters. In particular, referring to FIG. 13, subband signals from the multiple playback channels are aggregated into a single vector (box 1300). The inverse correlation matrix is updated using equation (7) and the round robin regularization (box 1310). The aggregated subband signals and the inverse correlation matrix are used to update the Kalman gain using equation (4) (box 1320). The Kalman gain is used to update the filter coefficients (box 1330). These filter coefficients contain coefficients for both the left and the right channels. The channel weights are de-aggregated (box 1340), where the first-channel filter coefficients are sent to the first-channel single-channel filter (box 1350) and the second-channel filter coefficients are sent to the second-channel single-channel filter (box 1360). The process continues recursively at every step. At every step, the current state of the single-channel filters is used to reduce the echo in the multi-channel signal. The captured signal with reduced echo is output.

Dynamic Switching Between Monaural and Multi-Channel Echo Cancellation

The multi-channel round robin regularization echo cancellation method and system also includes dynamic switching between echo cancellation algorithms best suited for monaural playback signals and echo cancellation best suited for multi-channel playback signals. The dynamic switching occurs between a mono AEC algorithm (such as NLMS) and the multi-channel round robin regularization echo cancellation method with efficient reinitialization of either process minimizing the distortion when switching from multi-channel processing to monaural processing and vice versa.

In signals having periods of a mono signal (such as talking) and periods of a multi-channel signal (such as music), a dynamic switching algorithm is used to intelligently determine whether the signal is mono (or nearly mono) or a multi-channel signal. If it is a mono signal, a mono AEC system as shown in FIG. 1 with normalized least mean squares (NMLS) algorithm is used. If it is a multi-channel signal, the multi-channel round robin regularization RLS echo cancellation method is used, as shown in FIG. 12. The switching is dynamic, such that little or no echo leaks through because the states of the NLMS and RLS algorithms are efficiently reinitialized during switching from one algorithm to the next. This is achieved by sharing state variables and using a novel estimation technique to estimate the correlation matrix for the RLS algorithm. This allows switching from NMLS (mono) back and forth between the multi-channel round robin regularization RLS without any glitches.

In particular, if the playback signal sent to the speakers is known to only be a purely mono signal, then using normalized least mean squares (NLMS) with a monaural adaptive filter (as shown in FIG. 1) tends to perform better than using the RLS with round robin regularization (shown in FIG. 8) for several reasons. For mono signals copied to multiple playback channels, RLS with round robin regularization will eventually diverge, the divergence time depending on the forgetting factor λ. As a result, the AEC algorithm may drift away from the true solution. However, NLMS with a single adaptive filter works well for mono signals and is known to be stable. In addition, NLMS has significantly lower CPU consumption than any type of multi-channel RLS.

Like RLS, NLMS can also be viewed as trying to solve the normal equation, $$w^o = R^{-1} p.$$

For NLMS, the normal equation is solved in a statistical manner using the method of steepest descent, while for RLS, the normal equation is solved deterministically using least-squares. Both methods essentially compute an estimate of $R^{-1}$. For RLS, the inverse of the correlation matrix is estimated by P. For NLMS, $R^{-1}$ can be viewed as a diagonal matrix with values, $$P(n, m, k, k) = R^{-1}(n, m, k, k) = \frac{1}{P_{Est}(n, m) + \beta_{NLMS}}. \quad (10)$$

As a result, the state of the inverse correlation matrix estimate can easily be initialized when switching from mono to multi-channel AEC. When transitioning from NLMS to RLS, the diagonal elements can be initialized as shown in equation (10). Likewise, when transitioning from the multi-channel round robin regularization echo cancellation method and system (shown in FIG. 8) to the mono AEC using NLMS (shown in FIG. 1), no state has to be initialized explicitly since the state is derived from the data history only.

Mixed Round Robin Regularization RLS and NLMS Processing

In order to lower central processing unit (CPU) resources needed to run the multi-channel round robin regularization echo cancellation method, a novel mixed RLS/NLMS processing algorithm is used. First, the signal is divided into lower subbands (containing the lower frequencies of a multi-channel playback signal) and upper subbands (containing the higher frequencies of the signal). On the lower subbands, the multi-channel round robin regularization echo cancellation method using RLS is used. On the upper subbands, the NLMS algorithm is used. The NMLS algorithm uses less CPU resources, and is used at the upper subbands because the stereo effect is attenuated at these frequencies. At lower frequencies, where the stereo effect is most noticeable, the superior multi-channel round robin regularization echo cancellation method is used at the expense of higher CPU processing costs.

Figure 14:
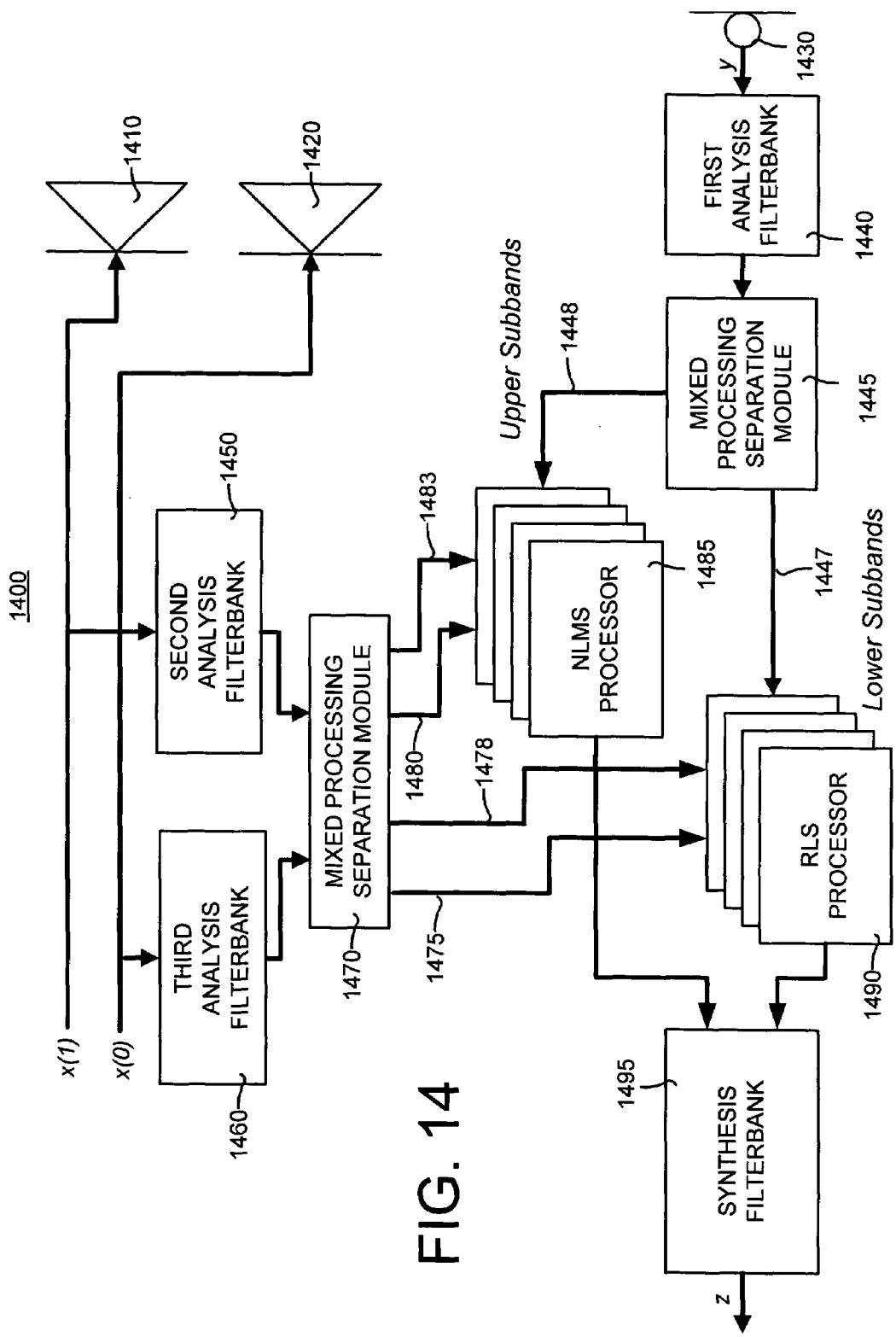
FIG. 14 illustrates the mixed Lower/upper subbands processing using the multi-channel round robin regularization method described herein.

FIG. 14 illustrates the mixed lower/upper subbands processing using the multi-channel round robin regularization method described herein. Generally, in order to reduce processing requirements, the lower subbands are processed using the using the multi-channel round robin regularization method implemented in RLS and the upper subbands are processed using NLMS. A mixed lower/upper subband echo cancellation system 1400 is shown that uses the multi-channel round robin regularization echo cancellation method. As shown in FIG. 14, at least two playback signals x(0) and x(1) are used. The playback signal x(1) is played through a right speaker 1410 and x(0) is played through a left speaker 1420.

A microphone 1430 captures unwanted echoes from a room (not shown) in which the microphone is located. A microphone signal y is processed by a first analysis filterbank 1440 and the playback signals x(0) and x(1) are processed by a second analysis filterbank 1450 and a third analysis filterbank 1460 such that signals x(0), x(1) and y are transformed from the time domain into the frequency domain signals X(0), X(1), and Y, respectively. The analysis filterbanks 1440, 1450, 1460 can be a windowed fast Fourier transform (FFT), a modulated complex lapped transform (MCLT), or some other frequency domain transform.

The transformed playback signals X(0) and X(1) are sent to a mixed processing separation module 1470. The module 1470 uses a separation process to divide the left playback signal X(0) into left lower subband signals 1475 and left upper subband signals 1480. Similarly, the right playback signal X(1) is divided into right lower subband signals 1478 and right upper subband signals 1483. Similarly, a mixed processing separation module 1445 divides the captured signal Y into upper subband signals 1448, and lower subband signals 1447. A plurality of NMLS processors 1485 receive the upper subbands of the transformed microphone signal Y, the left upper subband signals 1480 and the right upper subband signals 1483 for processing. Each NLMS processor 1485 processes a signal using the algorithm set forth in equations (1) and (2), where the mono input speaker signal in equation (3) is replaced with the multi-channel speaker signal in equation (8). A plurality of RLS processors 1490 using the multi-channel round robin regularization echo cancellation method (an example of this processor is shown in FIG. 13) are used to process the left lower playback subband signals 1475, the right lower playback subband signals 1478, and the lower subband capture signals, 1447. The processed lower subband and upper subband signals are sent to a synthesis filterbank 1495, which outputs a time domain signal z with reduced echo.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for canceling echo of a plurality of playback signals in a captured signal, comprising:
   decomposing the plurality of playback signals into a plurality of subband signals;
   applying a plurality of adaptive filters each having an inverse correlation matrix to the plurality of subband signals;
   selecting each of the plurality of adaptive filters in a round robin sequence;
   regularizing the inverse correlation matrix of each selected adaptive filter, regularizing the inverse correlation matrix further comprising:
      inverting the inverse correlation matrix to produce a correlation matrix;
      regularizing the correlation matrix to produce a regularized correlation matrix;
      obtaining a regularized inverse correlation matrix by inverting the regularized correlation matrix; and
   reducing the echo in the captured signal using the outputs of the adaptive filters.

2. The method as set forth in claim 1, wherein the plurality of adaptive filters comprises recursive least squares (RLS) adaptive filters.

3. The method as set forth in claim 2, further comprising applying the plurality of RLS adaptive filters in parallel.

4. The method as set forth in claim 2, further comprising having a length of the RLS adaptive filters longer in lower subband signals that contain lower frequencies of the plurality of subband signals and shorter in upper subband signals that contain higher frequencies of the plurality of subband signals.

5. The method as set forth in claim 1, wherein regularizing further comprises ensuring that the plurality of adaptive filters are stable.

6. The method as set forth in claim 1, wherein regularizing the inverse correlation matrix further comprises processing the inverse correlation matrix such that a determinant of the correlation matrix is not close to zero.

7. The method as set forth in claim 1, wherein regularizing the correlation matrix further comprises adding a small positive value to diagonal elements of the correlation matrix.

8. The method as set forth in claim 1, wherein regularizing the correlation matrix further comprises:
   defining a threshold value;
   comparing each diagonal element of the correlation matrix to the threshold value; and
   setting the diagonal element equal to the threshold value if the correlation matrix diagonal element is smaller than the threshold value.

9. The method as set forth in claim 1, wherein applying a plurality of adaptive filters comprises:
   adapting a plurality of weight vectors corresponding to each of the plurality of adaptive filters;
   de-aggregating each of the plurality of weight vectors to produce a plurality of single-channel filter coefficient vectors such that each playback channel has one corresponding single-channel filter coefficient vector; and
   applying the plurality of single-channel filter coefficient vectors to the plurality of subband signals.

10. The method as set forth in claim 1, wherein the captured signal comprises an acoustic signal.

11. The method as set forth in claim 1 wherein the captured signal comprises an electrical signal.

12. The method as set forth in claim 1, wherein the plurality of playback signals is a stereo signal.

13. The method as set forth in claim 1, wherein applying a plurality of adaptive filters further comprises identifying a transfer function of a room in which the echo is present.

14. A computer-readable medium having computer-executable instructions for performing the method recited in claim 1.

15. A computer-implemented method for eliminating echoes of a plurality of playback signals in a captured signal, comprising:
   decomposing the plurality of playback signals into subbands;
   processing the subbands using a recursive least squares (RLS) adaptive filter for each of the subbands;
   selecting each of the RLS adaptive filters in round robin scheme;
   regularizing the selected RLS adaptive filter to ensure stability, regularizing the selected RLS adaptive filters further comprising:
      computing a correlation matrix of the RLS adaptive filter by inverting an inverse correlation matrix;
      regularizing a correlation matrix of the RLS adaptive filter to obtain a regularized correlation matrix;
      computing a regularized inverse correlation matrix of the RLS adaptive filter from the regularized correlation matrix; and
   reducing echoes in the captured signal using the outputs of the RLS adaptive filters.

16. The computer-implemented method of claim 15, wherein the captured signal comprises an acoustic signal.

17. The computer-implemented method of claim 15, wherein the captured signal comprises an electrical signal.

18. The computer-implemented method of claim 15, wherein regularizing the selected RLS adaptive filter further comprises examining the correlation matrix of the RLS adaptive filter to determine whether regularization is necessary.

19. The computer-implemented method of claim 15, wherein regularizing the correlation matrix further comprises adding a small positive number to each diagonal element of the correlation matrix.

20. The computer-implemented method of claim 15, wherein regularizing the correlation matrix of the RLS adaptive filter further comprises:
   defining a threshold value; and
   setting a diagonal element of the correlation matrix equal to the threshold value if the diagonal element is smaller than the threshold value.

21. The computer-implemented method of claim 15, wherein computing the regularized inverse correlation matrix comprises inverting the regularized correlation matrix to obtain the regularized inverse correlation matrix.

22. The computer-implemented method of claim 15, wherein the round robin scheme comprises selecting a single RLS adaptive filter for every frame of audio data in the captured signal.

23. The computer-implemented method of claim 15, wherein the round robin scheme comprises selecting a single RLS adaptive filter every several frames of audio data in the captured signal.

24. The computer-implemented method of claim 15, wherein the round robin scheme comprises selecting multiple RLS adaptive filters for every frame of audio data in the captured signal.

25. A method for automatically switching between two different types of echo cancellation processes when processing one or more playback signals and a captured signal containing echo, comprising:
  detecting whether the one or more playback signals is monaural;
  processing the captured signal and the one or more playback signals using a monaural echo cancellation process if the one or more playback signals are monaural;
  processing the captured signal and the one of more playback signals using a multi-channel round robin regularization echo cancellation process if the one or more playback signals are not monaural;
  using an estimation technique to estimate a correlation matrix for the multi-channel round robin regularization echo cancellation process, using the estimation technique further comprising one of:
    (a) solving a normal equation in a statistical manner using a method of steepest descent when dynamically switching from the multi-channel round robin regularization echo cancellation process to the monaural echo cancellation process;
    (b) solving the normal equation deterministically using a least squares process when dynamically switching from the monaural echo cancellation process to the multi-channel round robin regularization echo cancellation process; and
  dynamically switching between the monaural echo cancellation process and the multi-channel round robin regularization echo cancellation process whenever the detection changes from one type to another.

26. The method as set forth in claim 25, wherein the monaural echo cancellation process is normalized least mean squares (NLMS) echo cancellation.

27. The method as set forth in claim 25, wherein the monaural echo cancellation process is least mean squares (LMS) echo cancellation.

28. The method as set forth in claim 25, wherein the monaural echo cancellation process and the multi-channel round robin regularization echo cancellation process share state variables.

29. The method as set forth in claim 25, wherein the captured signal contains lower captured subbands and upper captured subbands and further comprising processing the upper captured subband using a normalized least mean squares (NLMS) process.

30. A process for canceling echoes of a plurality of playback signals in a captured signal, the captured signal comprising lower captured subbands containing lower frequencies of the captured signal and higher captured subbands containing higher frequencies of the captured signal and the plurality of playback signals comprising lower playback subbands containing lower frequencies of the plurality of playback signals and higher playback subbands containing higher frequencies of the plurality of playback signals, the process comprising:
  using a first echo cancellation process to cancel echoes from the upper captured subbands; and
  using a multi-channel round robin regularization echo cancellation process to cancel the echoes in the lower captured subbands, the multi-channel round robin regularization echo cancellation process further comprising:
    applying a plurality of adaptive filters, which are recursive least square (RLS) adaptive filters and each of the plurality of adaptive filters comprising an inverse correlation matrix, to each of the lower playback subbands;
    selecting each of the plurality of adaptive filters in a round robin sequence;
    regularizing the inverse correlation matrix of each selected adaptive filter;
    computing each correlation matrix from an inverse correlation matrix.

31. The process of claim 30, wherein the first echo cancellation process is a normalized least mean squares (NLMS) process.

32. The process of claim 30, wherein regularizing further comprises adding a small, positive value to diagonal elements of the correlation matrix.

33. The process of claim 30, wherein regularizing the correlation matrix further comprises:
  defining a threshold value;
  comparing each diagonal element of the correlation matrix to the threshold value; and
  setting the diagonal element equal to the threshold value if the correlation matrix diagonal element is smaller than the threshold value.

34. The process of claim 30, wherein regularizing the correlation matrix further comprises ensuring that the plurality of adaptive filters remain stable.

* * * * *

UNITED STATES PATENT AND TRADEMARK OFFICE
CERTIFICATE OF CORRECTION

PATENT NO. : 7,352,858 B2
APPLICATION NO. : 10/883128
DATED : April 1, 2008
INVENTOR(S) : Jack W. Stokes et al.

It is certified that error appears in the above-identified patent and that said Letters Patent is hereby corrected as shown below:

In column 17, line 57, after " $K(m) = \frac{\lambda^{-1}P(n-1,m)X(n,m)}{1+\lambda^{-1}X^H(n,m)P(n-1,m)X(n,m)}$ " insert
-- $\xi(m) = Y(n,m) - \hat{W}^H(n,m)X(n,m)$ --.

In column 17, line 57, after " $\xi(m) = Y(n,m) - \hat{W}^H(n,m)X(n,m)$ " insert
-- $\hat{W}(n+1,m) = \hat{W}(n,m) + K(m)\xi^*(m)$ --.

In column 17, line 57, after " $\hat{W}(n+1,m) = \hat{W}(n,m) + K(m)\xi^*(m)$ " insert -- $P(n,m) = \lambda^{-1}P(n-1,m) - \lambda^{-1}K(m)X^H(n,m)P(n-1,m)$

*If (m == RoundRobinCount)*

$R(n,m) = P^{-1}(n,m)$ $R(n,m) = R(n,m) + \beta_{RLS}I$ $P(n,m) = R^{-1}(n,m)$ --.

In column 22, line 5, in Claim 11, after "1" insert --,--.

In column 22, line 10, in Claim 13, delete "identifying,a" and insert --identifying a--, therefor.

Signed and Sealed this
Twelfth Day of July, 2011

David J. Kappos
*Director of the United States Patent and Trademark Office*